US012703774B2

(12) United States Patent
Zhang et al.

(10) Patent No.: US 12,703,774 B2
(45) **Date of Patent: *Aug. 11, 2026**

(54) REGIOSELECTIVELY SUBSTITUTED CELLULOSE ESTER BASED NEGATIVE BIREFRINGENT COMPENSATION FILMS HAVING IMPROVED WAVELENGTH DISPERSION

(71) Applicant: Eastman Chemical Company, Kingsport, TN (US)

(72) Inventors: Qianqian Zhang, Kingsport, TN (US); Charles Michael Buchanan, Bluff City, TN (US); Casey Lynn Elkins, Kingsport, TN (US); Wesley Wayne McConnell, Gray, TN (US); Bin Wang, Kingsport, TN (US); Robert Jacks Sharpe, Madison, AL (US); Mustafa Humbel Ahmed, Lafayette, IN (US)

(73) Assignee: Eastman Chemical Company, Kingsport, TN (US)

( * ) Notice: Subject to any disclaimer, the term of this patent is extended or adjusted under 35 U.S.C. 154(b) by 1018 days.

This patent is subject to a terminal disclaimer.

(21) Appl. No.: 17/760,452

(22) PCT Filed: Feb. 10, 2021

(86) PCT No.: PCT/US2021/017357
§ 371 (c)(1),
(2) Date: Aug. 10, 2022

(87) PCT Pub. No.: WO2021/163117
PCT Pub. Date: Aug. 19, 2021

(65) Prior Publication Data
US 2023/0074167 A1 Mar. 9, 2023

Related U.S. Application Data

(60) Provisional application No. 62/975,870, filed on Feb. 13, 2020.

(51) Int. Cl.
*C08J 5/18* (2006.01)
*C08B 3/16* (2006.01)
*G02F 1/13363* (2006.01)

(52) U.S. Cl.
CPC *C08J 5/18* (2013.01); *C08B 3/16* (2013.01); *C08J 2301/14* (2013.01); *G02F 1/133637* (2021.01)

(58) Field of Classification Search
CPC .................................... C08J 5/18; C08B 3/16
(Continued)

(56) References Cited

U.S. PATENT DOCUMENTS 8,354,525 B2 1/2013 Buchanan et al.
8,729,253 B2 5/2014 Buchanan et al.
(Continued)

FOREIGN PATENT DOCUMENTS

JP 2006-328298 A 12/2006
JP 2007-297554 A 11/2007
(Continued)

OTHER PUBLICATIONS

Buchanan, Charles et al; "Regio selectively Substituted Cellulose Benzoate Propionates for Compensation Film in Optical Displays"; Carbohydrate Polymers, vol. 252; Sep. 28, 2020; 8 pages.
(Continued)

*Primary Examiner* — Ganapathy Krishnan
(74) *Attorney, Agent, or Firm* — Kenrick L. Vidale

(57) ABSTRACT

The present application discloses stretched films comprising regioselectively substituted cellulose esters and a component A

I

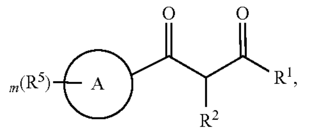

II

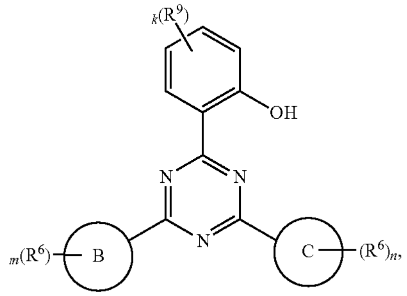

III or

IV (Continued)

wherein rings A, B, C, $R^1$, $R^2$, $R^5$, $R^6$, $R^8$, R9, m, n, and k are defined herein. The films exhibit negative birefringence and improved wavelength dispersion.

20 Claims, 1 Drawing Sheet

(58) Field of Classification Search
USPC ............................................................ 536/65
See application file for complete search history.

(56) References Cited

U.S. PATENT DOCUMENTS

| | | | |
|---|---|---|---|
| 9,096,691 | B2 | 8/2015 | Buchanan et al. |
| 9,370,901 | B2 | 6/2016 | Doi et al. |
| 9,796,791 | B2 | 10/2017 | Buchanan et al. |
| 9,804,314 | B2 | 10/2017 | Harada et al. |
| 9,834,516 | B2 | 12/2017 | Buchanan et al. |
| 9,975,967 | B2 | 5/2018 | Buchanan et al. |
| 12,252,603 | B2 * | 3/2025 | Zhang ........................ C08J 5/18 |
| 2009/0096962 | A1 | 4/2009 | Shelton et al. |
| 2009/0109379 | A1 * | 4/2009 | Fukagawa .............. C08K 5/435 349/96 |
| 2010/0029927 | A1 | 2/2010 | Buchanan et al. |
| 2010/0267942 | A1 | 10/2010 | Buchanan et al. |
| 2012/0003402 | A1 | 1/2012 | Ohashi et al. |
| 2012/0262650 | A1 | 10/2012 | Buchanan et al. |
| 2012/0263889 | A1 | 10/2012 | Buchanan et al. |
| 2012/0263890 | A1 | 10/2012 | Buchanan et al. |
| 2012/0264930 | A1 | 10/2012 | Buchanan et al. |
| 2016/0320539 | A1 | 11/2016 | Harada et al. |
| 2017/0306054 | A1 | 10/2017 | Boone et al. |
| 2017/0307796 | A1 | 10/2017 | Boone et al. |
| 2018/0258189 | A1 | 9/2018 | Buchanan et al. |

FOREIGN PATENT DOCUMENTS

| | | | | |
|---|---|---|---|---|
| JP | 2008242179 | A * | 10/2008 | ................ C08J 5/18 |
| JP | 4656523 | B2 | 3/2011 | |
| JP | 2014-513178 | A | 5/2014 | |
| JP | 6136254 | B2 | 5/2017 | |
| JP | 2020-518681 | A | 6/2020 | |
| WO | WO 20120141904 | A1 | 10/2012 | |
| WO | WO 2013073533 | A1 | 5/2013 | |
| WO | WO 2018183463 | A1 | 10/2018 | |
| WO | WO 2019/190756 | A1 * | 10/2019 | ............... C08B 3/16 |

OTHER PUBLICATIONS

Buchanan, Charles et al; "Preparation of Cellulose (1-carbon-13)Acetates and Determination of monomer Composition by NMR Spectroscopy"; Macromolecules, 1991, 24, 3050-3059.

Notification of Transmittal of the International Search Report and the Written Opinion of the International Searching Authority, or the Declaration date of mailing May 10, 2021 received in International Application No. PCT/US2021/017357.

* cited by examiner $$R_e = (n_x - n_y) \times d$$

$$R_{th} = \left(n_z - \frac{n_x + n_y}{2}\right) \times d$$

$$N_z = \frac{n_x - n_z}{n_x - n_y}$$

x, stretching direction
y, orthogonal in plan direction

REGIOSELECTIVELY SUBSTITUTED CELLULOSE ESTER BASED NEGATIVE BIREFRINGENT COMPENSATION FILMS HAVING IMPROVED WAVELENGTH DISPERSION

CROSS-REFERENCE TO RELATED APPLICATION(S)

This application is a national stage filing under 35 USC § 371 of International Application Number PCT/US2021/017357, filed on, Feb. 10, 2021 which claims the benefit of the filing date to U.S. Provisional Application No. 62/975,870, filed on Feb. 13, 2020, the entire disclosures of which are incorporated by reference herein.

BACKGROUND OF THE INVENTION

Cellulose ester ("CE") based films with negative birefringence are desirable for displays. However, negative birefringent CE films typically display normal wavelength dispersion, resulting in color shifts. To correct this problem, the films need to be tuned to exhibit improved wavelength dispersion, such as a flat or reverse wavelength dispersion. However, little is known on how to achieve flat or reverse wavelength dispersion in negative birefringent CE films. Applicants have disclosed stretched films comprising regioselectively substituted cellulose esters ("RCE") and certain small molecule components that have improved wavelength dispersion. Some of the films have Z or A-characteristics.

SUMMARY OF THE INVENTION

The present application discloses a film, comprising:

(1) a regioselectively substituted cellulose ester comprising:

(i) a plurality of aromatic-CO— substituents;

(ii) a plurality of a first unsaturated or saturated $(C_{1-6})$ alkyl-CO— substituents; and (iii) a plurality of hydroxyl substituents;

wherein:

the degree of substitution for the hydroxyl ("$DS_{OH}$") is from 0.2 to 1.1, the cellulose ester has a C2 degree of substitution for the aromatic-CO— substituent ("$C2DS_{ArCO}$") which is from 0.15 to 0.8, the cellulose ester has a C3 degree of substitution for the aromatic-CO— substituent ("$C3DS_{ArCO}$") which is from 0.05 to 0.6, the cellulose ester has a C6 degree of substitution for the aromatic-CO— substituent ("$C6DS_{ArCO}$") which is 0.05 to 0.6, the total degree of substitution for the aromatic-CO— substituent ("$TotDS_{ArCO}$") which is from 0.25 to 2.0, the aromatic-CO— is (i) an $(C_{6-20})$aryl-CO—, wherein the aryl is unsubstituted or substituted by 1-5 $R^1$;

(ii) a heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$; and (2) a component A that is

I

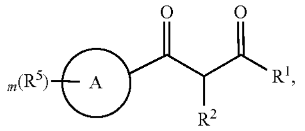

II

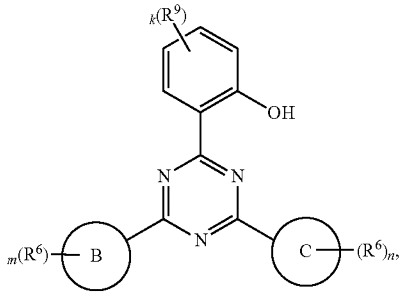

III

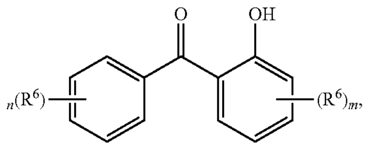

or

IV

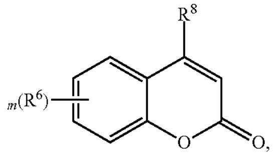

wherein:

ring A is an $(C_{6-20})$aryl or a 5- to 10-membered heteroaryl containing 1-4 heteroatoms chosen from N, O, or S;

ring B is $(C_{6-20})$aryl or a 5- to 10-membered heteroaryl containing 1-4 heteroatoms chosen from N, O, or S;

ring C is $(C_{6-20})$aryl a 5- to 10-membered heteroaryl containing 1-4 heteroatoms chosen from N, O, or S;

$R^1$ is saturated or unsaturated $(C_{1-20})$alkyl; saturated or unsaturated halo$(C_{1-20})$alkyl; $(C_{6-20})$aryl optionally by 1-5 substituted by alkyl, haloalkyl, alkoxy, haloalkoxy, halo; 5- to 10-membered heteroaryl containing 1-4 heteroatoms chosen from N, O, or S; or $—CH_2C(O)—R^3$;

$R^2$ is independently hydrogen, saturated or unsaturated $(C_{1-20})$alkyl, or saturated or unsaturated halo$(C_{1-20})$alkyl;

$R^3$ is saturated or unsaturated $(C_{1-20})$alkyl, saturated or unsaturated halo$(C_{1-20})$alkyl, $(C_{6-20})$aryl, or 5- to 10-membered heteroaryl containing 1-4 heteroatoms chosen from N, O, or S, wherein the aryl or heteroaryl are unsubstituted or substituted by 1-5 $R^6$;

$R^4$ is saturated or unsaturated $(C_{1-20})$alkyl, saturated or unsaturated halo$(C_{1-20})$alkyl, or saturated or unsaturated $(C_{1-20})$alkyl-CO—$(C_{1-20})$alkyl, wherein each of the groups is unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, saturated or unsaturated $(C_{1-20})$alkoxy-$(C_{1-20})$alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl;

each $R^5$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, or halo;

each $R^6$ is independently hydroxy, cyano, saturated or unsaturated $(C_{1-20})$alkyl, saturated or unsaturated halo$(C_1$-20)alkyl, saturated or unsaturated $(C_{1-20})$alkoxy, saturated or unsaturated halo$(C_{1-20})$alkoxy, or halo or $(C_{6-20})$aryl, wherein the aryl is unsubstituted or substituted by 1-5 $R^7$;

each $R^7$ is independently hydroxyl, saturated or unsaturated $(C_1$-6)alkyl, saturated or unsaturated halo $(C_{1-6})$alkyl, or saturated or unsaturated $(C_{1-6})$alkoxyl;

$R^8$ is saturated or unsaturated $(C_{1-20})$alkyl, saturated or unsaturated halo$(C_{1-20})$alkyl, saturated or unsaturated $(C_{1-20})$alkoxyl, or saturated or unsaturated halo $(C_{1-20})$alkoxyl;

each $R^9$ is $R^4$—O—, hydroxy, saturated or unsaturated $(C_{1-20})$alkyl, saturated or unsaturated hetero$(C_{1-20})$alkyl containing 1-2 heteroatoms chosen from N, O or S, saturated or unsaturated halo$(C_{1-20})$alkyl, saturated or unsaturated $(C_{1-20})$alkyl-CO—$(C_{1-20})$alkyl-, saturated or unsaturated $(C_{1-20})$alkyl-COO—$(C_{1-20})$alkyl-, saturated or unsaturated $(C_{1-20})$alkyl-COO—, saturated or unsaturated $(C_{1-20})$alkyl-O—CO—, saturated or unsaturated $(C_{1-20})$alkyl-CO, saturated or unsaturated $(C_{1-20})$alkoxy-$(C_{1-20})$alkyl-CO—O—$(C_{1-20})$alkyl, saturated or unsaturated $(C_{1-20})$alkoxy-$(C_{1-20})$alkyl-O—CO—$(C_{1-20})$alkyl, saturated or unsaturated $(C_{1-20})$alkoxy-$(C_{1-20})$alkyl-COO—$(C_{1-20})$alkyl, $(C_{1-20})$alkoxy-$(C_{1-20})$alkyl-O—CO—$(C_{1-20})$alkyl-$(C_{6-10})$aryl, 5- to 10-membered heteroaryl containing 1-4 heteroatoms selected from the group consisting of N, O, or S, wherein each of the groups are unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxyl, or saturated or unsaturated halo$(C_{1-20})$alkoxyl. saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, or saturated or unsaturated $(C_{1-20})$alkoxy-$(C_{1-20})$alkyl-CO—$(C_{1-20})$alkyl-, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl;

each n is 0, 1, 2, 3, 4, or 5;

each m is 0, 1, 2, 3, or 4; and k is 0, 1, 3, or 4, wherein:

the thickness of the film ("d") in microns is from 10 μm to 200 μm, the film exhibits a $R_e$(589 nm) that is less than zero, the ratio of the $R_e$ (589 nm) and d (nm) multiplied by 1000 is from −10 to −0.5, the ratio of the $R_{th}$ (589 nm) and d (nm) multiplied by 1000 is from −6.0 to 6.0, the film exhibits a [[—$R_{th}$ (589 nm)/$R_e$(589 nm)]+0.5]("$N_z$") is from −3.0 to 3.0, each $R_e$(589 nm) is the in-plane retardation measured at 589 nm, each $R_{th}$(589 nm) is the out-of-plane retardation measured at 589 nm, and the film is stretched.

BRIEF DESCRIPTION OF THE FIGURES

The present application makes reference to the following figures, wherein.

DETAILED DESCRIPTION OF THE INVENTION

Figure 1:
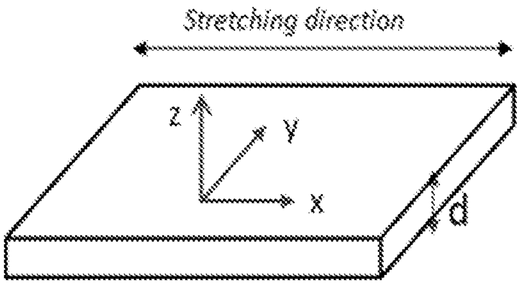
FIG. 1 provides a schematic representation for retardation films stretched along one direction (x direction).

The present invention may be understood more readily by reference to the following detailed description of the invention and the examples provided therein. It is to be understood that this invention is not limited to the specific methods, formulations, and conditions described, as such may vary. It is also to be understood that the terminology used herein is for the purpose of describing particular aspects of the invention only and is not intended to be limiting.

Definitions

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Regioselectively substituted cellulose esters suitable for use in making optical films can comprise a plurality of alkyl-acyl or alkyl-CO— substituents, a plurality of aryl-acyl or aryl-CO— substituents, heteroaryl-acyl or heteroaryl-CO— substituents. As used herein, the term "acyl substituent" or "R—CO—" shall denote a substituent having the structure:

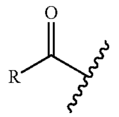

Such acyl or R—CO— groups in cellulose esters are generally bound to the pyranose ring of the cellulose via an ester linkage (i.e., through an oxygen atom).

Aromatic-CO— is an acyl substituent with an aromatic containing ring system. Examples include aryl-CO— or heteroaryl-CO—. Specific examples include benzoyl, naphthoyl, and furoyl, each being unsubstituted or substituted.

As used herein, the term "aryl-acyl" substituent shall denote an acyl substituent where "R" is an aryl group. As used herein, the term "aryl" shall denote a univalent group formed by removing a hydrogen atom from a ring carbon in an arene (i.e., a mono- or polycyclic aromatic hydrocarbon). In some cases the aryl-acyl group is preceded by the carbon units: For example, $(C_{5-6})$aryl-acyl, $(C_{6-12})$aryl-acyl, or $(C_{6-20})$aryl-acyl. Examples of aryl groups suitable for use in various embodiments include, but are not limited to, phenyl, benzyl, tolyl, xylyl, and naphthyl. Such aryl groups can be substituted or unsubstituted.

As used herein, the term "alkyl-acyl" shall denote an acyl substituent where "R" is an alkyl group. As used herein, the term "alkyl" shall denote a univalent group formed by removing a hydrogen atom from a non-aromatic hydrocarbon, and may include heteroatoms. Alkyl groups suitable for use herein can be straight, branched, or cyclic, and can be saturated or unsaturated. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Examples of alkyl-acyl groups include acetyl, propionyl, butyroyl, and the like.

"Haloalkyl" means an alkyl substituent where at least one hydrogen is replaced with a halogen group. The carbon units in the haloalkyl group is often included; for example halo $(C_{1-6})$alkyl. The haloalkyl group can be straight or branched. Nonlimiting examples of haloalkyl include chloromethyl, trifluoromethyl, dibromoethyl and the like.

"Heteroalkyl" means an alkyl wherein one or more of the carbon atoms are replace with a heteroatoms such as for example N, O, or S.

"Heteroaryl" means an aryl where at least one of the carbon units in the aryl ring is replaced with a heteroatom such as O, N, and S. The heteroaryl is ring can be monocyclic or polycyclic. Often the units making up the heteroaryl ring system is include; for example a 5- to 20-membered ring system. A 5-membered heteroaryl means a ring system having five atoms forming the heteroaryl ring. Nonlimiting examples of heteroaryl include pyridinyl, quinolinyl, pyrimidinyl, thiophenyl and the like.

"Alkoxy" means alkyl-O— or an alkyl group terminally attached to an oxygen group. Often the carbon units are included; for example $(C_{1-6})$alkoxy.

Nonlimiting examples of alkoxy include Methoxy, ethoxy, propoxy and the like. "Haloalkoxy" means alkoxy where at least one of the hydrogens is replace with a halogent. Often the carbon units are included; for example halo$(C_{1-6})$alkoxy. Nonlimiting examples of haloalkoxy include trifluoromethoxy, bromomethoxy, 1-bromo-ethoxy and the like. "Halo" means halogen such as fluoro, chloro, bromo, or iodo.

"Degree of Substitution" is used to describe the substitution level of the substituents of the substituents per anhydroglucose unit ("AGU"). Generally, conventional cellulose contains three hydroxyl groups in each AGU that can be substituted. Therefore, the DS can have a value between 0 and 3. However, low molecular weight cellulose mixed esters can have a total degree of substitution slightly above 3 from end group contributions. Low molecular weight cellulose mixed esters are discussed in more detail subsequently in this disclosure. Because DS is a statistical mean value, a value of 1 does not assure that every AGU has a single substituent. In some cases, there can be unsubstituted anhydroglucose units, some with two and some with three substituents, and more often than not the value will be a noninteger. Total DS is defined as the average number of all of substituents per anhydroglucose unit. The degree of substitution per AGU can also refer to a particular substituent, such as, for example, hydroxyl, acetyl, butyryl, or propionyl. Additionally, the degree of substitution can specify which carbon unit of the anhydroglucose unit.

When the degree of substitution refers to hydroxyl, i.e, $DS_{OH}$, the reference is to the average hydroxyl groups per anhydroglucose that are not substituted. As a result, $DS_{OH}$ is not used in the calculation of the total degree of substitution.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62°

F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Throughout this application, where patents or publications are referenced, the disclosures of these references in their entireties are intended to be incorporated by reference into this application, to the extent they are not inconsistent with the present invention, in order to more fully describe the state of the art to which the invention pertains.

Compensation films are important to improve the viewing quality of liquid crystal displays (LCD) and organic light emitting diode displays (OLED). For isotropic materials, the refractive indices are the same regardless of the polarization status of the entering light. As materials become oriented and anisotropic, the refractive indices become dependent on the directions. The difference between refractive indices along different directions is birefringence. For polymer films, stretching is usually required to make polymer oriented and lead to birefringence. Birefringence of compensation films are critical for the display qualities. It is widely used in-plane birefringence ($\Delta n_e$) and out-of-plane birefringence (Anth) to characterize the compensation films. $\Delta n_e$ and $\Delta n_{th}$ are defined by the following equations.

$$\Delta n_e = (n_x - n_y)$$

$$\Delta n_{th} = [n_z - (n_x + n_y)/2]$$

Where $n_x$ is the refractive index along the stretching direction in the film plane while $n_y$ is the refractive index perpendicular to the stretching direction in the film plane, and $n_z$ is the refractive index perpendicular to the film plane. For the majority of polymer materials, when the film is stretched along on direction (x direction), the refractive index along stretching direction ($n_x$) is larger than the refractive index orthogonal to the stretching direction ($n_y$) in the film plane, i.e. $\Delta n_e=(n_x-n_y)$ is larger than zero, and the stretching direction is the slow axis. in the film plane. Those polymer materials have positive birefringence. Some polymer materials have negative birefringence. When those materials are stretched along one direction (x direction), and the refractive index along stretching direction ($n_x$) is smaller than the refractive index orthogonal to the stretching direction ($n_y$) in the film plane, i.e. $\Delta n_e=(n_x-n_y)$ is smaller than zero, and the stretching direction is the fast axis in the film plane.

Correspondingly, in-plane retardation ($R_e$) and out-of-plane retardation ($R_{th}$) are defined as the products of $\Delta n_e$ with the thickness of the compensation film (d) and $\Delta n_{th}$ with d.

$$R_e = (n_x - n_y) * d$$

$$R_{th} = [n_z - (n_x + n_y)/2] * d$$

Where for polymer films with positive birefringence, $n_x$ is the refractive index along slow axis in the film plane, $n_y$ is the refractive index along fast axis in the film plane, and $n_z$ is the refractive index perpendicular to the film plane; for films with negative birefringence, $n_x$ is the refractive index along fast axis in the film plane, $n_y$ is the refractive index along slow axis in the film plane, and $n_z$ is the refractive index perpendicular to the film plane.

In addition, Nz coefficient is also widely used, as defined by the following equation.

$$N_z = (n_x - n_z)/(n_x - n_y) = -R_{th}/R_e + 0.5$$

Where for polymer films with positive birefringence, $n_x$ is the refractive index along slow axis in the film plane, $n_y$ is the refractive index along fast axis in the film plane, and $n_z$ is the refractive index perpendicular to the film plane; for films with negative birefringence, $n_x$ is the refractive index along fast axis in the film plane, $n_y$ is the refractive index along slow axis in the film plane, and $n_z$ is the refractive index perpendicular to the film plane.

Depending on the application field, various compensation films have been developed, such as biaxial films where all of three refractive indices are different ($n_x \neq n_y$, $n_x \neq n_z$, and $n_y \neq n_z$), and uniaxial films where two of the refractive indices are very close but different from the third one ($n_x=n_y \neq n_z$, $n_x=n_z \neq n_y$, $n_y=n_z \neq n_x$). For uniaxial films, there are A+ films, A− films, C+ films and C− films, which are defined by the following equations.

$$A+: n_x > n_y = n_z;\ N_z \text{ coefficient} = 1$$

$$A-: n_x < n_y = n_z;\ N_z \text{ coefficient} = 1$$

$$C+: n_x = n_y < n_z;\ N_z \text{ coefficient} = \infty$$

$$C-: n_x = n_y > n_z;\ N_z \text{ coefficient} = \infty$$

For biaxial films, one important category of biaxial films is Z film, where $n_x>n_z>n_y$ or $n_y>n_z>n_x$; most specifically, biaxial films with $n_z=(n_x+n_y)/2$, which will lead to $N_z$ coefficient equal to 0.5, is especially interesting.

Figure 2:
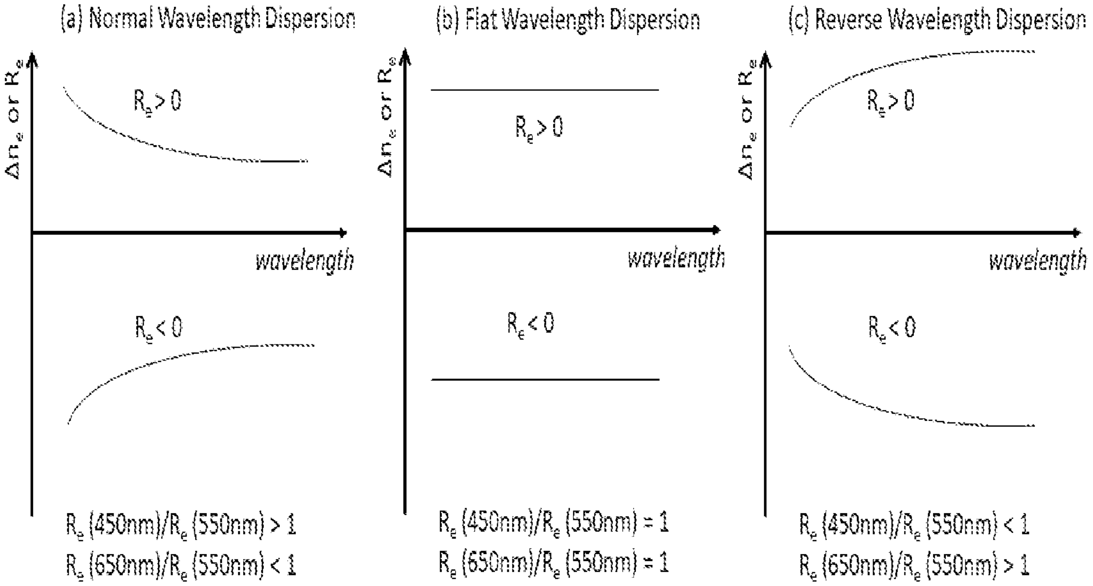
FIG. 2 provides diagrams for the modes for wavelength dispersion in compensation films: (a) normal wavelength dispersion, (b) flat wavelength dispersion, and (c) reverse wavelength dispersion.

In addition, wavelength dispersion is also important for compensation films. Wavelength dispersion relates to the relationship of birefringence or retardation with wavelength of light. $R_e$(450 nm)/$R_e$(550 nm), $R_e$(650 nm)/$R_e$(550 nm), $R_{th}$(450 nm)/$R_{th}$(550 nm) and $R_{th}$(650 nm)/$R_{th}$(550 nm), which indicates the ratio of retardation at 450 nm, 550 nm and 650 nm, are widely used to characterize the wavelength dispersion. As shown in FIG. 2, normal wavelength dispersion means the birefringence or retardation of compensation films is smaller at shorter wavelength with $R_e$(450 nm)/$R_e$(550 nm)>1, $R_e$(650 nm)/$R_e$(550 nm)<1, a flat wavelength dispersion means the birefringence or retardation of compensation films is constant over the wavelength range studied with $R_e$(450 nm)/$R_e$(550 nm)=1, $R_e$(650 nm)/$R_e$(550 nm)=1, and reverse wavelength dispersion means the birefringence or retardation of compensation films is smaller at shorter wavelength, with $R_e$(450 nm)/$R_e$(550 nm)<1, $R_e$(650 nm)/$R_e$(550 nm)>1. Reverse wavelength dispersion is highly desired as it can significantly depress the color shift of displays.

Cellulose esters have been widely used for compensation films. They have many advantages compared to other materials such as polycarbonate and poly(cyclic olefins). The majority of cellulose esters based compensation films are made from cellulose esters with aliphatic acyl substituents, such as cellulose acetate, cellulose acetate propionate and cellulose acetate butyrate. The acyl substituents are randomly distributed. And the birefringence of those compensation films is usually positive with $n_x>n_y$, where $n_x$ is the refractive index along the stretching direction in the film plane while $n_y$ is the refractive index perpendicular to the stretching direction in the film plane. Cellulose esters with negative birefringence ($n_x<n_y$) can be achieved by adding aromatic acyl substituents and controlling the positions of the aromatic acyl substituents or long aliphatic acyl substituents. One problem with compensation films made from cellulose esters with negative birefringence is the normal wavelength dispersion of those compensation films with $R_e(450\text{ nm})/R_e(550\text{ nm})>1$ and $R_e(650\text{ nm})/R_e(550\text{ nm})<1$. There is no commercial product based on cellulose esters with negative birefringence and flat or reverse wavelength dispersion. More specifically, there is no commercial product for Z film based on cellulose esters with negative birefringence and flat or reverse wavelength dispersion.

In various embodiments, regioselectively substituted cellulose esters can be employed in which the aryl-acyl substituent is preferentially installed at C2 and C3 of the pyranose ring. Regioselectivity can be measured by determining the relative degree of substitution ("RDS") at C6, C3, and C2 in the cellulose ester by carbon 13 NMR spectroscopy (*Macromolecules,* 1991, 24, 3050-3059). In the case of one type of acyl substituent or when a second acyl substituent is present in a minor amount (DS<0.2), the RDS can be most easily determined directly by integration of the ring carbons. When 2 or more acyl substituents are present in similar amounts, in addition to determining the ring RDS, it is sometimes necessary to fully substitute the cellulose ester with an additional substituent in order to independently determine the RDS of each substituent by integration of the carbonyl carbons. In conventional cellulose esters, regioselectivity is generally not observed and the RDS ratio of C6/C3, C6/C2, or C3/C2 is generally near 1 or less. In essence, conventional cellulose esters are random copolymers. In contrast, when adding one or more acylating reagents to cellulose dissolved in an appropriate solvent, the C6 position of cellulose is acylated much faster than C2 and C3 positions. Consequently, the C6/C3 and C6/C2 ratios are significantly greater than 1, which is characteristic of a 6,3- or 6,2-enhanced regioselectively substituted cellulose ester.

Examples of regioselectively substituted cellulose esters and their methods for preparation are described in US 2010/0029927, US 2010/0267942, and U.S. Pat. No. 8,354,525; the contents of which are hereby incorporated by reference. In general, these applications concern preparation of cellulose esters by dissolution of cellulose in an ionic liquid, which is then contacted with an acylating reagent. Accordingly, for various embodiments of the present invention, two general methods can be employed for preparing regioselectively substituted cellulose esters. In one method, regioselectively substituted cellulose esters can be prepared using a staged addition by first contacting the cellulose solution with one or more alkyl acylating reagents followed by contacting the cellulose solution with an aryl-acylating reagent at a contact temperature and contact time sufficient to provide a cellulose ester with the desired degree of substitution ("DS") and degree of polymerization ("DP"). In this staged addition, the acyl groups containing alkyl groups can be preferentially installed at C6 and the acyl groups containing an aryl group can be preferentially installed at C2 and/or C3. Alternatively, the regioselectively substituted cellulose esters can be prepared by contacting the cellulose solution with one or more alkyl acylating reagents followed by isolation of the alkyl ester in which the acyl groups containing alkyl groups are preferentially installed at C6. The alkyl ester can then be dissolved in any appropriate organic solvent and contacted with an aryl-acylating reagent which can preferentially install the acyl groups containing an aryl group at C2 and/or C3 at a contact temperature and contact time sufficient to provide a cellulose ester with the desired degree of substitution ("DS") and degree of polymerization ("DP").

Examples of regioselectively substituted cellulose esters and their methods for preparation are also described in US20170306054 and US20170307796; the contents of which are hereby incorporated by reference. In general, these applications concern preparation of cellulose esters by dissolution of starting cellulose esters with low degree of substitution (DS) in appropriate organic solvents, which is then contacted with an acylating reagent. Accordingly, for various embodiments of the present invention, two general methods can be employed for preparing regioselectively substituted cellulose esters. In one method, regioselectively substituted cellulose esters can be prepared using a staged addition by first contacting the starting cellulose ester solution with one or more alkyl acylating reagents followed by contacting the cellulose solution with an aryl-acylating reagent at a contact temperature and contact time sufficient to provide a cellulose ester with the desired degree of substitution ("DS") and degree of polymerization ("DP"). In this staged addition, the acyl groups containing alkyl groups can be preferentially installed at C6 and the acyl groups containing an aryl group can be preferentially installed at C2 and/or C3. Alternatively, the regioselectively substituted cellulose esters can be prepared by contacting the starting cellulose ester solution with one or more alkyl acylating reagents followed by isolation of the alkyl ester in which the acyl groups containing alkyl groups are preferentially installed at C6. The alkyl ester can then be dissolved in any appropriate organic solvent and contacted with an aryl-acylating reagent which can preferentially install the acyl groups containing an aryl group at C2 and/or C3 at a contact temperature and contact time sufficient to provide a cellulose ester with the desired degree of substitution ("DS") and degree of polymerization ("DP").

The cellulose esters thus prepared generally comprise the following structure:

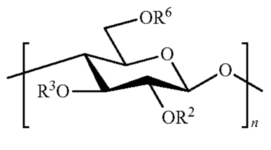

where $R^2$, $R^3$, and $R^6$ are hydrogen (with the proviso that $R^2$, $R^3$, and $R^6$ are not hydrogen simultaneously), alkyl-acyl groups, and/or aryl-acyl groups (such as those described above) bound to the cellulose via an ester linkage.

The degree of polymerization ("DP") of the cellulose esters prepared by these methods can be at least 10. In other embodiments, the DP of the cellulose esters can be at least 50, at least 100, or at least 250. In other embodiments, the DP of the cellulose esters can be in the range of from about 5 to about 100, or in the range of from about 10 to about 50.

Acylating reagents suitable for use herein can include, but are not limited to, alkyl or aryl carboxylic anhydrides, carboxylic acid halides, and/or carboxylic acid esters containing the above-described alkyl or aryl groups suitable for use in the acyl substituents of the regioselectively substituted cellulose esters described herein. Examples of suitable carboxylic anhydrides include, but are not limited to, acetic anhydride, propionic anhydride, butyric anhydride, pivaloyl anhydride, benzoic anhydride, and naphthoyl anhydride. Examples of carboxylic acid halides include, but are not limited to, acetyl, propionyl, butyryl, pivaloyl, benzoyl, and naphthoyl chlorides or bromides. Examples of carboxylic acid esters include, but are not limited to, acetyl, propionyl, butyryl, pivaloyl, benzoyl and naphthoyl methyl esters. In one or more embodiments, the acylating reagent can be one or more carboxylic anhydrides selected from the group consisting of acetic anhydride, propionic anhydride, butyric anhydride, pivaloyl anhydride, benzoyl anhydride, and naphthoyl anhydride.

Stretched Films

The present application discloses a film, comprising: (1) a regioselectively substituted cellulose ester comprising: (i) a plurality of aromatic-CO— substituents; (ii) a plurality of a first unsaturated or saturated $(C_{1-6})$alkyl-CO— substituents; and (iii) a plurality of hydroxyl substituents; wherein: the degree of substitution for the hydroxyl ("$DS_{OH}$") is from 0.2 to 1.1, the cellulose ester has a C2 degree of substitution for the aromatic-CO— substituent ("$C2DS_{ArCO}$") which is from 0.15 to 0.8, the cellulose ester has a C3 degree of substitution for the aromatic-CO— substituent ("$C3DS_{ArCO}$") which is from 0.05 to 0.6, the cellulose ester has a C6 degree of substitution for the aromatic-CO— substituent ("$C6DS_{ArCO}$") which is from 0.05 to 0.6, the total degree of substitution for the aromatic-CO— substituent ("$TotDS_{ArCO}$") which is from 0.25 to 2.0, the aromatic-CO— is an $(C_{6-20})$aryl-CO—, wherein the aryl is unsubstituted or substituted by 1-5 $R^1$; a heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$; and (2) a component A that is

I

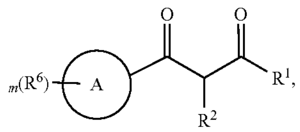

II

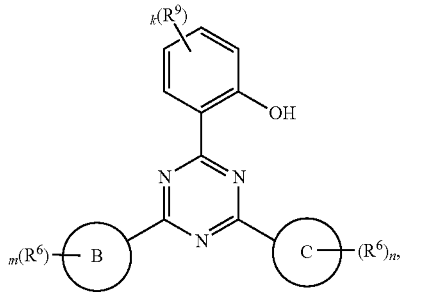

III

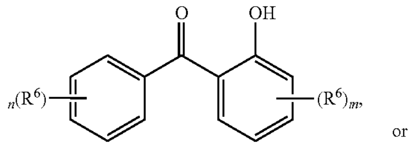

or

-continued

IV

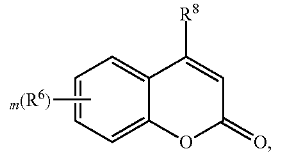

wherein: ring A is an $(C_{6-20})$aryl or a 5- to 10-membered heteroaryl containing 1-4 heteroatoms chosen from N, O, or S; ring B is $(C_{6-20})$aryl or a 5- to 10-membered heteroaryl containing 1-4 heteroatoms chosen from N, O, or S; ring C is $(C_{6-20})$aryl a 5- to 10-membered heteroaryl containing 1-4 heteroatoms chosen from N, O, or S; $R^1$ is saturated or unsaturated $(C_{1-20})$alkyl; saturated or unsaturated halo$(C_{1-20})$alkyl; $(C_{6-20})$aryl optionally by 1-5 substituted by alkyl, haloalkyl, alkoxy, haloalkoxy, halo; 5- to 10-membered heteroaryl containing 1-4 heteroatoms chosen from N, O, or S; or —$CH_2C(O)$—$R^3$; $R^2$ is independently hydrogen, saturated or unsaturated $(C_{1-20})$alkyl, or saturated or unsaturated halo$(C_{1-20})$alkyl; $R^3$ is saturated or unsaturated $(C_{1-20})$ alkyl, saturated or unsaturated halo$(C_{1-20})$alkyl, $(C_{6-20})$aryl, or 5- to 10-membered heteroaryl containing 1-4 heteroatoms chosen from N, O, or S, wherein the aryl or heteroaryl are unsubstituted or substituted by 1-5 $R^6$; $R^4$ is saturated or unsaturated $(C_{1-20})$alkyl, saturated or unsaturated halo$(C_{1-20})$alkyl, or saturated or unsaturated $(C_{1-20})$alkyl-CO—$(C_{1-20})$alkyl, wherein each of the groups is unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, saturated or unsaturated hydroxy $(C_{1-20})$alkyl, saturated or unsaturated $(C_{1-20})$alkoxy-$(C_{1-20})$ alkyl, saturated or unsaturated $(C_{1-20})$alkoxy-hydroxy$(C_{1-20})$ alkyl, saturated or unsaturated $(C_{1-20})$alkoxy-$(C_{1-20})$alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl; each $R^5$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, or halo; each $R^6$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$ alkoxy, or halo or $(C_{6-20})$aryl, wherein the aryl is unsubstituted or substituted by 1-5 $R^7$; each $R^7$ is independently hydroxyl, saturated or unsaturated $(C_{1-6})$alkyl, saturated or unsaturated halo$(C_{1-6})$alkyl, or saturated or unsaturated $(C_{1-6})$alkoxyl; $R^8$ is saturated or unsaturated $(C_{1-20})$ alkyl, saturated or unsaturated halo$(C_{1-20})$alkyl, saturated or unsaturated $(C_{1-20})$alkoxyl, or saturated or unsaturated halo $(C_{1-20})$alkoxyl; each $R^9$ is $R^4$—O—, hydroxy, saturated or unsaturated $(C_{1-20})$alkyl, saturated or unsaturated hetero $(C_{1-20})$alkyl containing 1-2 heteroatoms chosen from N, O or S, saturated or unsaturated halo$(C_{1-20})$alkyl, saturated or unsaturated $(C_{1-20})$alkyl-CO—$(C_{1-20})$alkyl-, saturated or unsaturated $(C_{1-20})$alkyl-COO—$(C_{1-20})$alkyl-, saturated or unsaturated $(C_{1-20})$alkyl-COO—, saturated or unsaturated $(C_{1-20})$alkyl-O—CO—, saturated or unsaturated $(C_{1-20})$alkyl-CO, saturated or unsaturated $(C_{1-20})$alkoxy-$(C_{1-20})$alkyl-CO—O—$(C_{1-20})$alkyl, saturated or unsaturated $(C_{1-20})$ alkoxy-($C_{1-20}$)alkyl-O—CO—($C_{1-20}$)alkyl, saturated or unsaturated ($C_{1-20}$)alkoxy-($C_{1-20}$)alkyl-COO—($C_{1-20}$)alkyl, ($C_{1-20}$)alkoxy-($C_{1-20}$)alkyl-O—CO—($C_{1-20}$)alkyl-($C_{6-10}$) aryl, 5- to 10-membered heteroaryl containing 1-4 heteroatoms selected from the group consisting of N, O, or S, wherein each of the groups are unsubstituted or substituted by 1-3 hydroxyl, saturated or unsaturated ($C_{1-20}$)alkyl, saturated or unsaturated halo($C_{1-20}$)alkyl, saturated or unsaturated ($C_{1-20}$)alkoxyl, or saturated or unsaturated halo($C_{1-20}$) alkoxyl. saturated or unsaturated hydroxy($C_{1-20}$)alkyl, saturated or unsaturated ($C_{1-20}$)alkoxy-($C_{1-20}$)alkyl, saturated or unsaturated ($C_{1-20}$)alkoxy-hydroxy($C_{1-20}$)alkyl, or saturated or unsaturated ($C_{1-20}$)alkoxy-($C_{1-20}$)alkyl-CO—($C_{1-20}$)alkyl-, saturated or unsaturated ($C_{1-20}$)alkyl-CO, saturated or unsaturated ($C_{1-20}$)alkyl-COO, saturated or unsaturated ($C_{1-20}$)alkyl-O—CO—$C_{(1-20)}$alkyl, saturated or unsaturated ($C_{1-20}$)alkyl-COO—$C_{(1-20)}$alkyl, saturated or unsaturated ($C_{1-20}$)alkoxy-($C_{1-20}$)alkyl-COO—($C_{1-20}$)alkyl, or ($C_{1-20}$)alkoxy-($C_{1-20}$)alkyl-O—CO—($C_{1-20}$)alkyl; each n is 0, 1, 2, 3, 4, or 5; each m is 0, 1, 2, 3, or 4; and k is 0, 1, 3, or 4, wherein: component A is present at less than 30 wt %, based on the total weight of the composition, the thickness of the film ("d") (μm) is from 10 μm to 200 μm, the film exhibits a $R_e$(589 nm) that is less than zero, the ratio of the $R_e$(589 nm) and d (nm) multiplied by 1000 is from −10 to −0.5, the ratio of the $R_{th}$ (589 nm) and d (nm) multiplied by 1000 is from −6.0 to 6.0, the film exhibits a [[—$R_{th}$(589 nm)/$R_e$(589 nm)]+0.5]("$N_z$") is from −3.0 to 3.0, each $R_e$(589 nm) is the in-plane retardation measured at 589 nm, each $R_{th}$(589 nm) is the out-of-plane retardation measured at 589 nm, and the film is stretched.

In one embodiment or in combination with any other embodiment, $R^9$ is $R^4$—O—. In one embodiment or in combination with any other embodiment, $R^9$ is ($C_{1-20}$)alkyl, ($C_{1-20}$)alkyl-, ($C_{1-20}$)alkyl-O—($C_{1-20}$)alkyl-, or ($C_{1-20}$)alkyl-O—($C_{1-20}$)alkyl-O—.

In one embodiment or in combination with any other embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one class of this embodiment, the $R_e$(589 nm) is from −240 nm to −320 nm, the $R_{th}$(589 nm) is from −60 nm to 60 nm. In one class of this embodiment, the $R_e$(589 nm) is from −120 nm to −160 nm, the $R_{th}$(589 nm) is from −30 nm to 30 nm.

In one embodiment or in combination with any other embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one class of this embodiment, the $R_e$(589 nm) is from −120 nm to −160 nm, the $R_{th}$(589 nm) is from −30 nm to 30 nm. In one class of this embodiment, the $R_e$(589 nm) is from −240 nm to −320 nm, the $R_{th}$(589 nm) is from −30 nm to 30 nm.

In one embodiment or in combination with any other embodiment, $N_z$ is from −2.0 to 2.0.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one subclass of this class, the $R_e$(589 nm) is from −240 nm to −320 nm, the $R_{th}$(589 nm) is from −60 nm to 60 nm. In one subclass of this class, the $R_e$(589 nm) is from −120 nm to −160 nm, the $R_{th}$(589 nm) is from −30 nm to 30 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one subclass of this class, the $R_e$(589 nm) is from −120 nm to −160 nm, the $R_{th}$(589 nm) is from −30 nm to 30 nm. In one subclass of this class, the $R_e$(589 nm) is from −240 nm to −320 nm, the $R_{th}$(589 nm) is from −30 nm to 30 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from −1.0 to 1.0.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from 0.15 to 4.2.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, $N_z$ is from −1.5 to 1.5.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one subclass of this class, the $R_e$(589 nm) is from −240 nm to −320 nm, the $R_{th}$(589 nm) is from −60 nm to 60 nm. In one subclass of this class, the $R_e$(589 nm) is from −120 nm to −160 nm, the $R_{th}$(589 nm) is from −30 nm to 30 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one subclass of this class, the $R_e$(589 nm) is from −120 nm to −160 nm, the $R_{th}$(589 nm) is from −30 nm to 30 nm. In one subclass of this class, the $R_e$(589 nm) is from −240 nm to −320 nm, the $R_{th}$(589 nm) is from −30 nm to 30 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from −1.0 to 1.0.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from 0.15 to 4.2.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm. In one class of this embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, $N_z$ is from 0.2 to 0.8.

In one class of this embodiment, wherein $R_e$ (589 nm) is from −120 to −320 nm and $R_{th}$ (589 nm) is from −60 to 60 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one subclass of this class, the $R_e$(589 nm) is from −240 nm to −320 nm, the $R_{th}$(589 nm) is from −60 nm to 60 nm. In one subclass of this class, the $R_e$(589 nm) is from −120 nm to −160 nm, the $R_{th}$(589 nm) is from −30 nm to 30 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one subclass of this class, the $R_e$(589 nm) is from −120 nm to −160 nm, the $R_{th}$(589 nm) is from −30 nm to 30 nm. In one subclass of this class, the $R_e$(589 nm) is from −240 nm to −320 nm, the $R_{th}$(589 nm) is from −30 nm to 30 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from −1.8 to 1.8.

In one subclass of this class, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this class, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from −1.0 to 1.0.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, $N_z$ is from 0.4 to 0.6.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one subclass of this class, the $R_e$(589 nm) is from −240 nm to −320 nm, the $R_{th}$(589 nm) is from −60 nm to 60 nm. In one subclass of this class, the $R_e$(589 nm) is from −120 nm to −160 nm, the $R_{th}$(589 nm) is from −30 nm to 30 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one subclass of this class, the $R_e$(589 nm) is from −120 nm to −160 nm, the $R_{th}$(589 nm) is from −30 nm to 30 nm. In one subclass of this class, the $R_e$(589 nm) is from −240 nm to −320 nm, the $R_{th}$(589 nm) is from −30 nm to 30 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, $N_z$ is from 0.8 to 1.2.

In one class of this embodiment, wherein $R_e$ (589 nm) is from −120 to −320 nm and $R_{th}$ (589 nm) is from 60 to 120 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

In one subclass of this class, the $R_e$(589 nm) is from −240 nm to −320 nm, the $R_{th}$(589 nm) is from −60 nm to 60 nm. In one subclass of this class, the $R_e$(589 nm) is from −120 nm to −160 nm, the $R_{th}$(589 nm) is from −30 nm to 30 nm.

In one class of this embodiment or in combination with any other class within this embodiment, the $R_e$(589 nm) is from −120 nm to −320 nm, the $R_{th}$(589 nm) is from −60 nm to 60 nm, the ratio of $R_e$(450 nm) to $R_e$(550 nm) is from 0.75 to 0.95, and the ratio of $R_e$(650 nm) to $R_e$(550 nm) is from 0.97 to 1.15.

In one subclass of this class, the $R_e$(589 nm) is from −120 nm to −160 nm, the $R_{th}$(589 nm) is from −30 nm to 30 nm. In one subclass of this class, the $R_e$(589 nm) is from −240 nm to −320 nm, the $R_{th}$(589 nm) is from −30 nm to 30 nm.

In one class of this embodiment, the ratio of $R_e$ (589 nm) and d (nm) multiplied by 1000 is from −6.0 to −0.5, and the ratio of $R_{th}$ (589 nm) and d (nm) multiplied by 1000 is from 0.15 to 4.2.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$ (589 nm) and d (nm) multiplied by 1000 is from −8.0 to −0.5, and the ratio of $R_{th}$ (589 nm) and d (nm) multiplied by 1000 is from 0.15 to 5.6.

In one subclass of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one subclass of this embodiment, the ratio of $R_e$(450 nm) to $R_e$(550 nm) is from 0.75 to 0.85, wherein $R_e$(450 nm)

is the in-plane retardation measured at 450 nm, and $R_e$(550 nm) is the in-plane retardation measured at 550 nm.

In one sub-subclass of this subclass, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one sub-subclass of this subclass, the ratio of $R_e$(650 nm) to $R_e$(550 nm) is from 1.10 to 1.2, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one class of this embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one subclass of this class, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one subclass of this class, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the ratio of $R_e$ (589 nm)/d and d (nm) multiplied by 1000 is from −6.0 to −0.5. In one class of this embodiment, the ratio of $R_{th}$ (589 nm)/d and d (nm) multiplied by 1000 is from −3.0 to 3.0. In one class of this embodiment, the ratio of $R_{th}$ (589 nm)/d and d (nm) multiplied by 1000 is from −2.0 to 2.0. In one class of this embodiment, the ratio of $R_{th}$ (589 nm)/d and d (nm) multiplied by 1000 is from −1.8 to 1.8. In one class of this embodiment, the ratio of $R_{th}$ (589 nm)/d and d (nm) multiplied by 1000 is from −1.0 to 1.0.

In one embodiment or in combination with any other embodiment, the ratio of $R_e$ (589 nm)/d and d (nm) multiplied by 1000 is from −8.0 to −0.5. In one class of this embodiment, the ratio of $R_{th}$ (589 nm)/d and d (nm) multiplied by 1000 is from −3.0 to 3.0. In one class of this embodiment, the ratio of $R_{th}$ (589 nm)/d and d (nm) multiplied by 1000 is from −2.4 to 2.4. In one class of this embodiment, the ratio of $R_{th}$ (589 nm)/d and d (nm) multiplied by 1000 is from −1.8 to 1.8. In one class of this embodiment, the ratio of $R_{th}$ (589 nm)/d and d (nm) multiplied by 1000 is from −1.0 to 1.0.

In one embodiment or in combination with any other embodiment, the ratio of $R_{th}$ (589 nm)/d and d (nm) multiplied by 1000 is from −3.0 to 3.0. In one embodiment, the ratio of $R_{th}$ (589 nm)/d and d (nm) multiplied by 1000 is from −2.0 to 2.0. In one embodiment, the ratio of $R_{th}$ (589 nm)/d and d (nm) multiplied by 1000 is from −1.8 to 1.8. In one embodiment, the ratio of $R_{th}$ (589 nm)/d and d (nm) multiplied by 1000 is from −1.0 to 1.0.

In one embodiment or in combination with any other embodiment, the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

In one class of this embodiment, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the ratio of $R_e$(450 nm) to $R_e$(550 nm) is less than 1.0, wherein $R_e$(450 nm) is the in-plane retardation measured at 450 nm, and $R_e$(550 nm) is the in-plane retardation measured at 550 nm.

In one class of this embodiment, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the ratio of $R_e$(450 nm) to $R_e$(550 nm) is less than 0.9, wherein $R_e$(450 nm) is the in-plane retardation measured at 450 nm, and $R_e$(550 nm) is the in-plane retardation measured at 550 nm.

In one class of this embodiment, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is greater than 1.0, wherein the $R_e$(650 nm)

is the in-plane retardation measured at 650 nm and $R_e$(550 nm) is the in-plane retardation measured at 550 nm.

In one class of this embodiment, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the ratio of $R_e$(450 nm) to $R_e$(550 nm) is 0.75 to 0.85, wherein $R_e$(450 nm) is the in-plane retardation measured at 450 nm, and $R_e$(550 nm) is the in-plane retardation measured at 550 nm.

In one class of this embodiment, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm.

In one class of this embodiment, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm. In one embodiment or in combination with any other embodiment, the ratio of $R_e$(650 nm) to $R_e$(550 nm) is greater than 1.0, wherein the $R_e$(650 nm) is the in-plane retardation measured at 650 nm and $R_e$(550 nm) is the in-plane retardation measured at 550 nm. In one embodiment or in combination with any other embodiment, the ratio of $R_e$(650 nm) to $R_e$(550 nm) is from 1.10 to 1.25, wherein the $R_e$(650 nm) is the in-plane retardation measured at 650 nm and $R_e$(550 nm) is the in-plane retardation measured at 550 nm.

In one embodiment or in combination with any other embodiment, the film is uniaxially stretched, biaxially stretched, or stretched at angles. In one class of this embodiment, the film is uniaxially stretched or biaxially stretched. In one class of this embodiment, the film is uniaxially stretched. In one class of this embodiment, the film is biaxially stretched. In one class of this embodiment, the film is stretched at angles.

In one embodiment or in combination with any other embodiment, the component A is

III

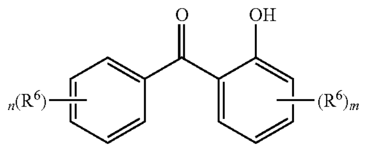

In one class of this embodiment or in combination with any other embodiment, the component A is present at greater than 1 wt %. In one class of this embodiment, the component A is present in the range of from 1 wt % to 30 wt %. In one embodiment, the component A is present in the range of from 1 wt % to 20 wt %. In one embodiment, the component A is present in the range of from 1 wt % to 15 wt %.

In one embodiment or in combination with any other embodiment, the component A is

IV

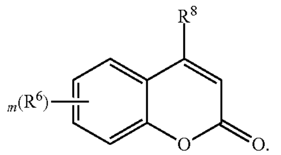

In one class of this embodiment, the component A is present at greater than 1 wt %. In one class of this embodiment, the component A is present in the range of from 1 wt % to 30 wt %. In one embodiment, the component A is present in the range of from 1 wt % to 20 wt %. In one embodiment, the component A is present in the range of from 1 wt % to 15 wt %.

In one embodiment or in combination with any other embodiment, the component A is

I

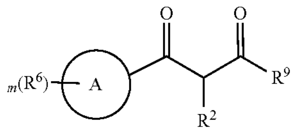

or

II

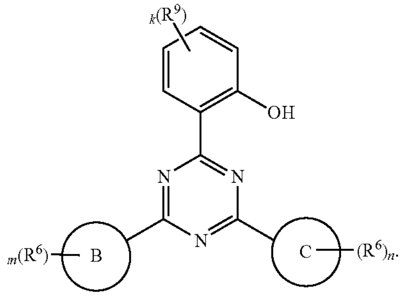

In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is

II

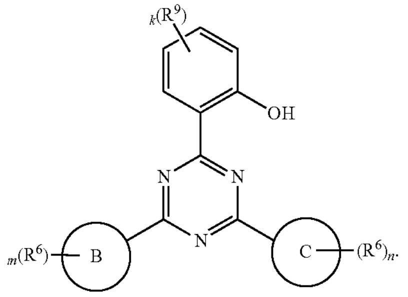

In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is

I

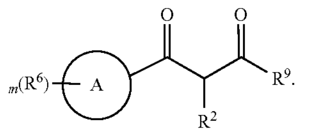

In one class of this embodiment, the component A is present at greater than 1 wt %. In one class of this embodiment, the component A is present in the range of from 1 wt % to 30 wt %.

In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 1,3-diphenyl-1,3-propanedione, avobenzone, (2-hydroxy-4-(octyloxy)phenyl(phenyl) methanone, (2-hydroxy-4-methoxyphenyl)(2-hydroxyphenyl)methanone, 2-(4,6-diphenyl-1,3,5-triazin-2-yl)-5-(hexyloxy)phenol (Tinuvin 1577), 2-[4,6-bis(2,4-dimethylphenyl)-1,3,5-triazin-2-yl]-5-[2-hydroxy-3-(dodecyloxy- and tridecyloxy)propoxy]phenols (Tinuvin 400), isooctyl 2-(4-(4,6-di([1,1'-biphenyl]-4-yl)-1,3,5-triazin-2-yl)-3-hydroxyphenoxy)propanoate (Tinuvin 479), 6,6'-(6-(2,4-dibutoxyphenyl)-1,3,5-triazine-2,4-diyl)bis(3-butoxyphenol) (Tinuvin 460), 2-(4,6-bis(2,4-dimethylphenyl)-1,3,5-triazin-2-yl)-5-(3-((2-ethylhexyl)oxy)-2-hydroxypropoxy)phenol (Tinuvin 405), 7-diethylamino-4-methylcoumarin, or combinations thereof.

In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 1,3-diphenyl-1,3-propanedione. In one class of this embodiment, the component A is present at greater than 1 wt %. In one class of this embodiment, the component A is present in the range of from 1 wt % to 30 wt %. In one embodiment or in combination with any other embodiment, the component A is present in the range of from 1 wt % to 20 wt %. In one class of this embodiment, the component A is present in the range of from 1 wt % to 15 wt %.

In one embodiment or in combination with any other embodiment, the component A is avobenzone. In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is, 2-(4,6-diphenyl-1,3,5-triazin-2-yl)-5-(hexyloxy)phenol (Tinuvin 1577). In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment, the component A is isooctyl 2-(4-(4,6-di([1,1'-biphenyl]-4-yl)-1,3,5-triazin-2-yl)-3-hydroxyphenoxy)propanoate (Tinuvin 479). In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 6,6'-(6-(2,4-dibutoxyphenyl)-1,3,5-triazine-2,4-diyl)bis(3-butoxyphenol) (Tinuvin 460). In one class of this embodiment, the component A is present at greater than 1 wt %. In one class of this embodiment, the component A is present in the range of from 1 wt % to 30%. In one class of this embodiment, the component A is present in the range of from 1 wt % to 20 wt %. In one class of this embodiment, the component A is present in the range of from 1 wt % to 15 wt %.

In one embodiment or in combination with any other embodiment, the celluloses ester has a degree of substitution for first unsaturated or saturated ($C_{1-6}$)alkyl-acyl substituent ("$DS_{FAk}$") that is from 0.7 to 2.2. In one embodiment, the celluloses ester has a degree of substitution for first unsaturated or saturated ($C_{1-6}$)alkyl-acyl substituent ("$DS_{FAk}$") that is from 0.7 to 1.9.

In one class of this embodiment, the first unsaturated or saturated ($C_{1-20}$)alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl. In one class of this embodiment, the first unsaturated or saturated ($C_{1-6}$)alkyl-CO— substituent is acetyl, propionyl, or crotonyl.

In one embodiment or in combination with any other embodiment, the cellulose ester further comprises a plurality of a second ($C_{1-20}$)alkyl-CO— substituent. In one class of this embodiment, the degree of substitution for the second ($C_{1-20}$)alkyl-CO— substituent ("$DS_{SAk}$") is from 0.05 to 0.6.

In one class of this embodiment, the second ($C_{1-20}$)alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, pivalyl, or 2-ethylhexanoyl. In one class of this embodiment, the second ($C_{1-20}$)alkyl-CO— substituent is acetyl, isobutyryl, 3-methylbutanoyl, pentanoyl, 4-methylpentanoyl, 3-methylpentanoyl, 2-methylpentanoyl, hexanoyl, or 2-ethylhexanoyl. In one class of this embodiment, the second ($C_{1-20}$)alkyl-CO— substituent is acetyl or 2-ethylhexanoyl.

In one embodiment or in combination with any other embodiment, the aromatic-CO— is an ($C_{6-20}$)aryl-CO—, wherein the aryl is unsubstituted or substituted by 1-5 $R^1$. In one class of this embodiment, the aromatic-CO— is benzoyl or naphthoyl, which is unsubstituted or substituted by 1-5 $R^1$. In one class of this embodiment, the aromatic-CO— is benzoyl, unsubstituted or substituted by 1-5 $R^1$. In one class of this embodiment, the aromatic-CO— is naphthoyl, unsubstituted or substituted by 1-5 $R^1$.

In one embodiment or in combination with any other embodiment, the aromatic-CO— is benzoyl, unsubstituted or substituted by 1-5 $R^1$. In one class of this embodiment, the cellulose ester has a total $DS_{ArCO}$ of from 0.40 to 1.20. In one subclass of this class, the sum of $C2DS_{ArCO}$ and $C3DS_{ArCO}$ is from 0.30 to 0.75.

In one class of this embodiment, the cellulose ester has a total $DS_{ArCO}$ of from 0.50 to 1.10. In one subclass of this class, the sum of $C2DS_{ArCO}$ and $C3DS_{ArCO}$ is from 0.30 to 0.75.

In one embodiment or in combination with any other embodiment, the aromatic-CO— is naphthoyl, unsubstituted or substituted by 1-5 $R^1$. In one class of this embodiment, the cellulose ester has a total $DS_{ArCO}$ of from 0.30 to 0.6. In one subclass of this class, the sum of $C2DS_{ArCO}$ and $C3DS_{ArCO}$ is from 0.20 to 0.40. In one subclass of this class, the sum of $C2DS_{ArCO}$ and $C3DS_{ArCO}$ is from 0.30 to 0.40.

In one class of this embodiment, the cellulose ester has a total $DS_{ArCO}$ of from 0.50 to 1.10. In one subclass of this class, the sum of $C2DS_{ArCO}$ and $C3DS_{ArCO}$ is from 0.20 to 0.40. In one subclass of this class, the sum of $C2DS_{ArCO}$ and $C3DS_{ArCO}$ is from 0.30 to 0.40.

In one embodiment or in combination with any other embodiment, the aromatic-CO— is heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$. In one class of this embodiment, the heteroaryl-CO— is a pyridinyl-CO—, a pyrimidinyl-CO—, a furanyl-CO—, or a pyrrolyl-CO—. In one class of this embodiment, the heteroaryl-CO— is 2-furoyl.

In one embodiment or in combination with any other embodiment, the cellulose ester has a $totDS_{ArCO}$ of from 0.4 to 1.6. In one embodiment or in combination with any other embodiment, the cellulose ester has a $totDS_{ArCO}$ of from 1.0 to 1.6. In one embodiment or in combination with any other embodiment, the cellulose ester has a $totDS_{ArCO}$ of from 0.3 to 1.25. In one embodiment or in combination with any other embodiment, the cellulose ester has a $totDS_{ArCO}$ of from 0.4 to 1.2. In one embodiment or in combination with any other embodiment, the cellulose ester has a $totDS_{ArCO}$ of from 0.4 to 0.8. In one embodiment or in combination with any other embodiment, the cellulose ester has a $totDS_{ArCO}$ of from 0.3 to 0.8. In one embodiment or in combination with any other embodiment, the cellulose ester has a $totDS_{ArCO}$ of from 0.3 to 0.6. In one embodiment or in combination with any other embodiment, the cellulose ester has a $totDS_{ArCO}$ of from 0.2 to 06. In one embodiment or in combination with any other embodiment, the cellulose ester has a $totDS_{ArCO}$ of from 0.2 to 0.5. In one embodiment or in combination with any other embodiment, the cellulose ester has a $totDS_{ArCO}$ of from 0.8 to 1.2. In one embodiment or in combination with any other embodiment, the cellulose ester has a $totDS_{ArCO}$ of from 0.5 to 1.1.

In one embodiment or in combination with any other embodiment, the $DS_{OH}$ is from 0.3-1.0. In one embodiment or in combination with any other embodiment, the $DS_{OH}$ is from 0.3-0.9. In one embodiment or in combination with any other embodiment, the $DS_{OH}$ is from 0.4-0.9. In one embodiment or in combination with any other embodiment, the $DS_{OH}$ is from 0.5-0.9. In one embodiment or in combination with any other embodiment, the $DS_{OH}$ is from 0.6-0.9. In one embodiment or in combination with any other embodiment, the $DS_{OH}$ is from 0.4-0.8. In one embodiment or in combination with any other embodiment, the $DS_{OH}$ is from 0.5-0.8.

In one embodiment or in combination with any other embodiment, the sum of the $C2DS_{ArCO}$ and $C3DS_{ArCO}$ is from 0.3 to 1.25. In one embodiment or in combination with any other embodiment, the sum of the $C2DS_{ArCO}$ and $C3DS_{ArCO}$ is from 0.2 to 0.4. In one embodiment or in combination with any other embodiment, the sum of the $C2DS_{ArCO}$ and $C3DS_{ArCO}$ is from 0.3 to 0.4. In one embodiment or in combination with any other embodiment, the sum of the $C2DS_{ArCO}$ and $C3DS_{ArCO}$ is from 0.4 to 1.2. In one embodiment or in combination with any other embodiment, the sum of the $C2DS_{ArCO}$ and $C3DS_{ArCO}$ is from 0.4 to 1.1. In one embodiment or in combination with any other embodiment, the sum of the $C2DS_{ArCO}$ and $C3DS_{ArCO}$ is from 0.4 to 1.0. In one embodiment or in combination with any other embodiment, the sum of the $C2DS_{ArCO}$ and $C3DS_{ArCO}$ is from 0.5 to 1.1. In one embodiment or in combination with any other embodiment, the sum of the $C2DS_{ArCO}$ and $C3DS_{ArCO}$ is from 0.6 to 1.0. In one embodiment or in combination with any other embodiment, the sum of the $C2DS_{ArCO}$ and $C3DS_{ArCO}$ is from 0.6 to 1.25. In one embodiment or in combination with any other embodiment, the sum of the $C2DS_{ArCO}$ and $C3DS_{ArCO}$ is from 0.30 to 0.75.

In one embodiment or in combination with any other embodiment, the component A is present at greater than 1 wt %. In one embodiment or in combination with any other embodiment, the component A is present at greater than 2.5 wt %. In one embodiment or in combination with any other embodiment, the component A is present in the range of from 1 wt % to 30 wt %. In one embodiment or in combination with any other embodiment, the component A is present in the range of from 2.5 wt % to 30 wt %. In one embodiment or in combination with any other embodiment, the component A is present in the range of from 5 wt % to 30 wt %. In one embodiment or in combination with any other embodiment, the component A is present in the range of from 2.5 wt % to 25 wt %. In one embodiment or in combination with any other embodiment, the component A is present in the range of from 1 wt % to 30 wt %. In one embodiment or in combination with any other embodiment, the component A is present in the range of from 1 wt % to 20 wt %. In one embodiment or in combination with any other embodiment, the component A is present in the range of from 1 wt % to 18 wt %. In one embodiment or in combination with any other embodiment, the component A is present in the range of from 1 wt % to 15 wt %. In one embodiment or in combination with any other embodiment, the component A is present in the range of from 1 wt % to 10 wt %.

In one embodiment or in combination with any other embodiment, m is 1. In one embodiment or in combination with any other embodiment, m is 2. In one embodiment or in combination with any other embodiment, m is 3. In one embodiment or in combination with any other embodiment, m is 4. In one embodiment or in combination with any other embodiment, m is 5. In one embodiment or in combination with any other embodiment, m is 1, 2, 3, or 4. In one embodiment or in combination with any other embodiment, m is 1, 2, or 3. In one embodiment or in combination with any other embodiment, m is 1, or 2.

In one embodiment or in combination with any other embodiment, n is 1. In one embodiment or in combination with any other embodiment, n is 2. In one embodiment, n is 3. In one embodiment or in combination with any other embodiment, n is 4. In one embodiment, n is 5. In one embodiment or in combination with any other embodiment, n is 1, 2, 3, or 4. In one embodiment or in combination with any other embodiment, n is 1, 2, or 3. In one embodiment or in combination with any other embodiment, n is 1, or 2.

A plasticizer can be added to improve workability and flexibility of the films. It may lower the glass transition point and melting temperature of the material the film is formed from, which could facilitate lower temperature and/or simplified film manufacturing. The plasticizer should be compatible with cellulose esters disclosed herein and have a boiling point higher than the maximum temperature applied in the film preparation and conditioning process requiring in particular nonvolatile plasticizer compounds in the case of film formation by melt casting.

In one embodiment or in combination with any other embodiment, the film further comprises 0.1 to 15 wt % of a plasticizer.

In one class of this embodiment or in combination with any other class of this embodiment, the plasticizer is present from 0.1 to 10 wt %. In one class of this embodiment or in combination with any other class of this embodiment, the plasticizer is present from 0.1 to 5 wt %. In one class of this embodiment or in combination with any other class of this embodiment, the plasticizer is present from 5 to 10 wt %. In one class of this embodiment or in combination with any other class of this embodiment, the plasticizer is present from 3 to 7 wt %.

In one class of this embodiment or in combination with any other class of this embodiment, the plasticizer is chosen from a phosphate type plasticizer, a phthalate type plasticizer, a terephthalate type plasticizer, a trimelitate type plasticizer, a benzoate type plasticizer, a glycolate type plasticizer, a citrate type plasticizer, a polyvalent alcohol ester type plasticizer, a polyol type plasticizer, or a polyester type plasticizer. In one subclass of this class, the plasticizer is chosen from Nonlimiting examples of glycolate plasticizers include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Nonlimiting examples of phosphate type plasticizers include triphenyl phosphate and tricresyl phosphate.

Nonlimiting examples of citrate type plasticizers include triacetyl citrate and tributyl citrate.

Nonlimiting examples of benzoate type plasticizers include 2-naphthyl benzoate (BANE), dipropylene glycol dibenzoate, and diethylene glycol dibenzoate.

Nonlimiting examples of phthalate type plasticizers include dicyclohexyl phthalate, dibenzyl phthalate, dimethyl phthalate, diethyl phthalate, dibutyl phthalate, di-2-ethylhexyl phthalate, diphenyl phthalate, and dihexyl phthalate.

Nonlimiting examples of phthalate type plasticizers include dimethyl terephthalate, diethyl terephthalate, dibutyl terephthalate, di-2-ethylhexyl terephthalate, diphenyl terephthalate and dihexyl terephthalate.

Nonlimiting examples of polyester type plasticizers include adipic acid polyesters such as Admex 523, Admex 6995, and Admex 760.

Nonlimiting examples of polyol type plasticizers include cyclohexane-1,4-dimethanol, sorbitol, 1,3-propanediol, ethylene glycol, glycerine, triethyleneglycol, tetramethyleneglycol, trimethylolpropane, and xylitol.

Nonlimiting examples of polyvalent alcohol ester type plasticizers include triethylene glycol bis(2-ethylhexanoate), dipropylene glycol dibenzoate, and diethylene glycol dibenzoate. Nonlimiting examples of trimellitate type plasticizers include tris(2-ethylhexanoate) trimellitate, and cresyldiphenyl phosphate.

The films disclosed in this application are useful in LCD, OLED, and QD OLED devices. The present application discloses a device comprising any of the previously disclosed films.

In one embodiment, the device is a liquid crystal display (LCD), organic light emitting diode (OLED), or quantum dot organic light emitting diode (QD OLED) device. In one class of this embodiment, the device is an LCD device. In one class of this embodiment, the device is an OLED device. In one class of this embodiment, the device is an QD OLED device.

Specific Embodiments

Embodiment 1. A film, comprising: (1) a regioselectively substituted cellulose ester comprising: (i) a plurality of aromatic-CO— substituents; (ii) a plurality of a first unsaturated or saturated ($C_{1-6}$)alkyl-CO— substituents; and (iii) a plurality of hydroxyl substituents; wherein: the degree of substitution for the hydroxyl ("$DS_{OH}$") is from 0.2 to 1.1, the cellulose ester has a C2 degree of substitution for the aromatic-CO— substituent ("$C2DS_{ArCO}$") which is from 0.15 to 0.8, the cellulose ester has a C3 degree of substitution for the aromatic-CO— substituent ("$C3DS_{ArCO}$") which is from 0.05 to 0.6, the cellulose ester has a C6 degree of substitution for the aromatic-CO— substituent ("$C6DS_{ArCO}$") which is from 0.05 to 0.6, the total degree of substitution for the aromatic-CO— substituent ("$TotDS_{ArCO}$") which is from 0.25 to 2.0, the aromatic-CO— is an ($C_{6-20}$)aryl-CO—, wherein the aryl is unsubstituted or substituted by 1-5 $R^1$; a heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$; and (2) a component A that is

I

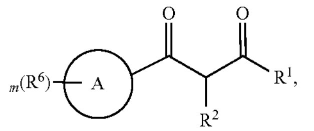

II

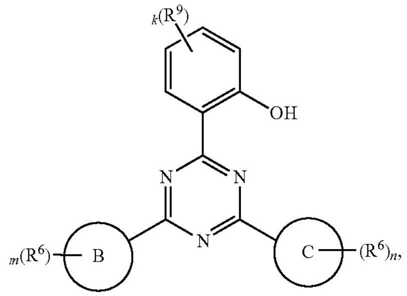

-continued

III

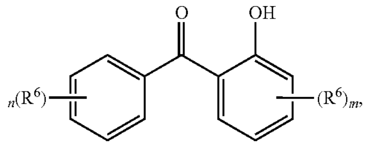

or

IV

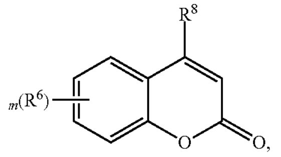

wherein: ring A is an $(C_{6-20})$aryl or a 5- to 10-membered heteroaryl containing 1-4 heteroatoms chosen from N, O, or S; ring B is $(C_{6-20})$aryl or a 5- to 10-membered heteroaryl containing 1-4 heteroatoms chosen from N, O, or S; ring C is $(C_{6-20})$aryl a 5- to 10-membered heteroaryl containing 1-4 heteroatoms chosen from N, O, or S; $R^1$ is saturated or unsaturated $(C_{1-20})$alkyl; saturated or unsaturated halo$(C_{1-20})$alkyl; $(C_{6-20})$aryl optionally by 1-5 substituted by alkyl, haloalkyl, alkoxy, haloalkoxy, halo; 5- to 10-membered heteroaryl containing 1-4 heteroatoms chosen from N, O, or S; or —$CH_2C(O)$—$R^3$; $R^2$ is independently hydrogen, saturated or unsaturated $(C_{1-20})$alkyl, or saturated or unsaturated halo$(C_{1-20})$alkyl; $R^3$ is saturated or unsaturated $(C_{1-20})$ alkyl, saturated or unsaturated halo$(C_{1-20})$alkyl, $(C_{6-20})$aryl, or 5- to 10-membered heteroaryl containing 1-4 heteroatoms chosen from N, O, or S, wherein the aryl or heteroaryl are unsubstituted or substituted by 1-5 $R^6$; $R^4$ is saturated or unsaturated $(C_{1-20})$alkyl, saturated or unsaturated halo$(C_{1-20})$alkyl, or saturated or unsaturated $(C_{1-20})$alkyl-CO—$(C_{1-20})$alkyl, wherein each of the groups is unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, saturated or unsaturated hydroxy $(C_{1-20})$alkyl, saturated or unsaturated $(C_{1-20})$alkoxy-$(C_{1-20})$ alkyl, saturated or unsaturated $(C_{1-20})$alkoxy-hydroxy$(C_{1-20})$ alkyl, saturated or unsaturated $(C_{1-20})$alkoxy-$(C_{1-20})$alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl; each $R^5$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, or halo; each $R^6$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$ alkoxy, or halo or $(C_{6-20})$aryl, wherein the aryl is unsubstituted or substituted by 1-5 $R^7$; each $R^7$ is independently hydroxyl, saturated or unsaturated $(C_{1-6})$alkyl, saturated or unsaturated halo$(C_{1-6})$alkyl, or saturated or unsaturated $(C_{1-6})$alkoxyl; $R^8$ is saturated or unsaturated $(C_{1-20})$ alkyl, saturated or unsaturated halo$(C_{1-20})$alkyl, saturated or unsaturated $(C_{1-20})$alkoxyl, or saturated or unsaturated halo $(C_{1-20})$alkoxyl; each $R^9$ is $R^4$—O—, hydroxy, saturated or unsaturated $(C_{1-20})$alkyl, saturated or unsaturated hetero $(C_{1-20})$alkyl containing 1-2 heteroatoms chosen from N, O or S, saturated or unsaturated halo$(C_{1-20})$alkyl, saturated or unsaturated $(C_{1-20})$alkyl-CO—$(C_{1-20})$alkyl-, saturated or unsaturated $(C_{1-20})$alkyl-COO—$(C_{1-20})$alkyl-, saturated or unsaturated $(C_{1-20})$alkyl-COO—, saturated or unsaturated $(C_{1-20})$alkyl-O—CO—, saturated or unsaturated $(C_{1-20})$alkyl-CO, saturated or unsaturated $(C_{1-20})$alkoxy-$(C_{1-20})$alkyl-CO—O—$(C_{1-20})$alkyl, saturated or unsaturated $(C_{1-20})$ alkoxy-$(C_{1-20})$alkyl-O—CO—$(C_{1-20})$alkyl, saturated or unsaturated $(C_{1-20})$alkoxy-$(C_{1-20})$alkyl-COO—$(C_{1-20})$alkyl, $(C_{1-20})$alkoxy-$(C_{1-20})$alkyl-O—CO—$(C_{1-20})$alkyl-$(C_{6-10})$ aryl, 5- to 10-membered heteroaryl containing 1-4 heteroatoms selected from the group consisting of N, O, or S, wherein each of the groups are unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxyl, or saturated or unsaturated halo$(C_{1-20})$ alkoxyl. saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, or saturated or unsaturated $(C_{1-20})$alkoxy-$(C_{1-20})$alkyl-CO—$(C_{1-20})$alkyl-, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl; each n is 0, 1, 2, 3, 4, or 5; each m is 0, 1, 2, 3, or 4; and k is 0, 1, 3, or 4, wherein: component A is present at less than 30 wt %, based on the total weight of the composition, the thickness of the film ("d") (μm) is from 10 μm to 200 μm, the film exhibits a $R_e$(589 nm) that is less than zero, the ratio of the $R_e$(589 nm) and d (nm) multiplied by 1000 is from −10 to −0.5, the ratio of the $R_{th}$ (589 nm) and d (nm) multiplied by 1000 is from −6.0 to 6.0, the film exhibits a [[—$R_{th}$(589 nm)/$R_e$(589 nm)]+0.5]("$N_z$") is from −3.0 to 3.0, each $R_e$(589 nm) is the in-plane retardation measured at 589 nm, each $R_{th}$(589 nm) is the out-of-plane retardation measured at 589 nm, and the film is stretched.

Embodiment 2. The film of claim 1, comprising: (1) a regioselectively substituted cellulose ester comprising: (i) a plurality of aromatic-CO— substituents; (ii) a plurality of a first unsaturated or saturated $(C_{1-6})$alkyl-CO— substituents; and (iii) a plurality of hydroxyl substituents; wherein: the degree of substitution for the hydroxyl ("$DS_{OH}$") is from 0.2 to 1.1, the cellulose ester has a C2 degree of substitution for the aromatic-CO— substituent ("$C2DS_{ArCO}$") which is from 0.15 to 0.7, the cellulose ester has a C3 degree of substitution for the aromatic-CO— substituent ("$C3DS_{ArCO}$") which is from 0.05 to 0.5, the cellulose ester has a C6 degree of substitution for the aromatic-CO— substituent ("$C6DS_{ArCO}$") which is 0.05 to 0.6, the aromatic-CO— is an $(C_{6-20})$aryl-CO—, wherein the aryl is unsubstituted or substituted by 1-5 $R^1$; a heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$; and (2) a component A that is

I

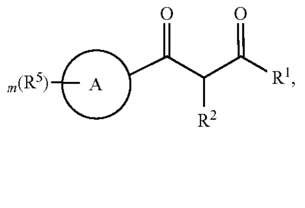

-continued

II

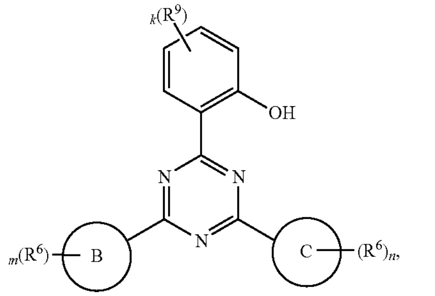

III

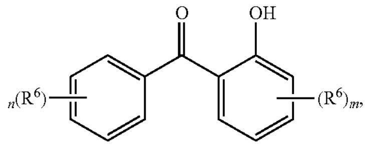

or

IV

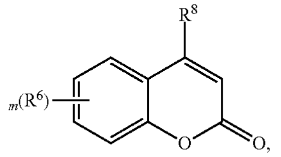

wherein: ring A is an $(C_{6-20})$aryl or a 5 to 10-membered heteroaryl containing 1-4 heteroatoms chosen from N, O, or S; ring B is $(C_{6-20})$aryl; ring C is $(C_{6-20})$aryl; $R^1$ is alkyl; haloalkyl; $(C_{6-20})$aryl optionally by 1-5 substituted by alkyl, haloalkyl, alkoxy, haloalkoxy, halo; 5 to 10-membered heteroaryl containing 1-4 heteroatoms chosen from N, O, or S; or —$CH_2C(O)$—$R^3$; $R^2$ is independently hydrogen, alkyl, or haloalkyl; $R^3$ is alkyl, haloalkyl, $(C_{6-20})$aryl, or 5 to 10-membered heteroaryl containing 1-4 heteroatoms chosen from N, O, or S, wherein the aryl or heteroaryl are unsubstituted or substituted by 1-5 $R^6$; $R^4$ is $(C_{1-20})$alkyl, halo$(C_{1-20})$alkyl, $(C_{1-20})$alkyl-CO—$(C_{1-20})$alkyl, wherein each (i.e., alkyl, haloalkyl, or alkyl-CO-alkyl) is unsubstituted or substituted by 1-3 hydroxyl, $(C_{1-20})$alkoxyl, or halo$(C_{1-20})$alkoxyl. hydroxy$(C_{1-20})$alkyl, $(C_{1-20})$alkoxy-$(C_{1-20})$alkyl, $(C_{1-20})$alkoxy-hydroxy$(C_{1-20})$alkyl, or $(C_{1-20})$alkoxy-$(C_{1-20})$alkyl-CO—$(C_{1-20})$alkyl-; each $R^5$ is independently hydroxy, cyano, alkyl, haloalkyl, alkoxy, haloalkoxy, or halo; each $R^6$ is independently hydroxy, cyano, alkyl, haloalkyl, alkoxy, haloalkoxy, or halo or $(C_{6-20})$aryl, wherein the aryl is unsubstituted or substituted by 1-5 $R^7$; each $R^7$ is independently hydroxyl, $(C_{1-6})$alkyl, halo$(C_{1-6})$alkyl, or $(C_{1-6})$alkoxyl; $R^8$ is $(C_{1-20})$alkyl, halo$(C_{1-20})$alkyl, $(C_{1-20})$alkoxyl, or halo$(C_{1-20})$alkoxyl; each n is 0, 1, 2, 3, 4, or 5; and each m is 0, 1, 2, 3, or 4; wherein: component A is present at less than 30 wt %, based on the total weight of the composition, the thickness of the film ("d") (μm) is from 10 μm to 200 μm, the film exhibits a $R_e$(589 nm) that is less than zero, the ratio of the $R_e$(589 nm) and d (nm) multiplied by 1000 is from −10 to −0.5, the ratio of the $R_{th}$ (589 nm) and d (nm) multiplied by 1000 is from −6.0 to 6.0, the film exhibits a [[—$R_{th}$(589 nm)/$R_e$(589 nm)]+0.5]("$N_z$") is from −3.0 to 3.0, each $R_e$(589 nm) is the in-plane retardation measured at 589 nm, each $R_{th}$(589 nm) is the out-of-plane retardation measured at 589 nm, and the film is stretched.

Embodiment 3. The film of any one of Embodiments 1 or 2, wherein $N_z$ is from 0.2 to 0.8.

Embodiment 4. The film of any one of Embodiments 1-3, wherein the ratio of $R_e$ (589 nm) and d (nm) multiplied by 1000 is from −6.0 to −0.5, and the ratio of $R_{th}$ (589 nm) and d (nm) multiplied by 1000 is from −1.8 to 1.8.

Embodiment 5. The film of any one of Embodiments 1 or 2, wherein $N_z$ is from 0.8 to 1.2.

Embodiment 6. The film of any one of Embodiments 1-5, wherein the $R_e$(589 nm) is from −120 nm to −320 nm, the $R_{th}$(589 nm) is from −60 nm to 60 nm, the ratio of $R_e$(450 nm) to $R_e$(550 nm) is from 0.95 to 1.02, and the ratio of $R_e$(650 nm) to $R_e$(550 nm) is from 0.95 to 1.05, wherein the $R_e$(450 nm), $R_e$(550 nm), and $R_e$(650 nm) are the in-plane retardations measured at 450 nm, 550 nm and 650 nm, respectively.

Embodiment 7. The film of any one of Embodiments 1-6, wherein the ratio of $R_e$ (589 nm) and d (nm) multiplied by 1000 is from −6.0 to −0.5, and the ratio of $R_{th}$ (589 nm) and d (nm) multiplied by 1000 is from 0.15 to 4.2.

Embodiment 8. The film of any one of Embodiments 1-7, wherein the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

Embodiment 9. The film of any one of Embodiments 1-8, wherein the ratio of $R_e$(450 nm) to $R_e$(550 nm) is from 0.75 to 0.85.

Embodiment 10. The film of any one of Embodiments 1-9, wherein the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

Embodiment 11. The film of Embodiment 10, wherein the ratio of $R_e$(650 nm) to $R_e$(550 nm) is from 1.10 to 1.2.

Embodiment 12. The film of any one of Embodiments 1-11, wherein the component A is

I

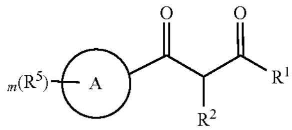

or

II

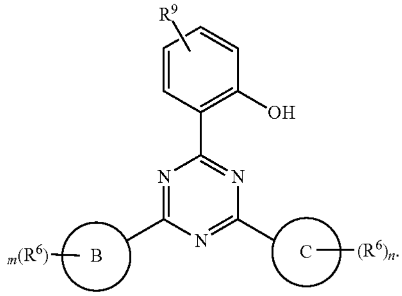

Embodiment 12. The film of any one of Embodiments 1-11, wherein the component A is 1,3-diphenyl-1,3-propanedione, avobenzone, (2-hydroxy-4-(octyloxy)phenyl(phenyl) methanone, (2-hydroxy-4-methoxyphenyl)(2-hydroxyphenyl)methanone, 2-(4,6-diphenyl-1,3,5-triazin-2-yl)-5-(hexyloxy)phenol, 2-[4,6-bis(2,4-dimethylphenyl)-1,3,5-triazin-2-yl]-5-[2-hydroxy-3-(dodecyloxy- and tridecyloxy) propoxy]phenols, isooctyl 2-(4-(4,6-di([1,1'-biphenyl]-4-yl)-1,3,5-triazin-2-yl)-3-hydroxyphenoxy)propanoate, 6,6'-(6-(2,4-dibutoxyphenyl)-1,3,5-triazine-2,4-diyl)bis(3-butoxyphenol), 2-(4,6-bis(2,4-dimethylphenyl)-1,3,5- triazin-2-yl)-5-(3-((2-ethylhexyl)oxy)-2-hydroxypropoxy) phenol, 7-diethylamino-4-methylcoumarin, or combinations thereof.

Embodiment 13. The film of any one of Embodiments 1-12, wherein the aromatic-CO— is an $(C_{6-20})$aryl-CO—, wherein the aryl is unsubstituted or substituted by 1-5 $R^1$.

Embodiment 14. The film of Embodiment 13, wherein the aromatic-CO— is benzoyl or naphthoyl, which is unsubstituted or substituted by 1-5 $R^1$.

Embodiment 15. The film of Embodiment 14, wherein the aromatic-CO— is benzoyl, unsubstituted or substituted by 1-5 $R^1$.

Embodiment 16. The film of Embodiment 15, wherein the cellulose ester has a $totDS_{ArCO}$ of from 0.40 to 1.6.

Embodiment 17. The film of Embodiment 18, wherein the sum of $C2DS_{ArCO}$ and $C3DS_{ArCO}$ is from 0.30 to 1.25.

Embodiment 18. The film of Embodiment 14, wherein the aromatic-CO— is naphthoyl, unsubstituted or substituted by 1-5 $R^1$.

Embodiment 19. The film of any one of Embodiments 17-19, wherein cellulose ester has a $totDS_{ArCO}$ of from 0.3 to 0.8.

Embodiment 20. The film of Embodiment 19, wherein the sum of $C2DS_{ArCO}$ and $C3DS_{ArCO}$ is from 0.2 to 0.6.

Embodiment 21. The film of any one of Embodiments 1-20, wherein the first unsaturated or saturated $(C_{1-20})$alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl.

Embodiment 22. The film of any one of Embodiments 1-21, wherein the cellulose ester further comprises a plurality of a second $(C_{1-20})$alkyl-CO— substituent.

Embodiment 23. The film of any one of Embodiments 1-22, wherein the film further comprises a plasticizer.

Embodiment 24. A device comprising the film of any one of Embodiments 1-23.

Embodiment 25, The device of Embodiment 24, wherein the device is a liquid crystal display ("LCD"), an organic light emitting diode ("OLED") or a quantum dot organic light emitting diode ("QD OLED").

EXAMPLES

Abbreviations

1MIM: 1-methylimidazole; 2EH or 2-EH: 2-ethylhexanoyl; 2EHCl: 2-ethylhexanoyl chloride; AcOH: acetic acid; Ak: alkyl acyl or alkyl-CO—; Ak1 is same as FAk; Ak2 is same as SAk; Ar: aryl; ArCO: aryl-acyl or aryl-CO—; atm: atmosphere; Bz: benzoyl; BzCl: benzoyl chloride; $Bz_2O$: Benzoic anhydride; ° C.: degree(s) Celsius; C2DS: degree substitution at the $C_2$ position; C3DS: the degree of substitution at the C3 position; C6DS: the degree of substitution at the C6 position; CAcPr: acetyl propionyl substituted cellulose ester or cellulose acetate propionate; CCrBz: crotonyl and benzoyl substituted cellulose ester or cellulose crotonate benzoate; CE: cellulose ester(s); COc: octanoyl substituted cellulose ester or cellulose octanoate; CPN: cyclopentanone; CPr: propionyl substituted cellulose ester or cellulose propionate; CPrBz: propionyl and benzoyl substituted cellulose ester or cellulose propionate benzoate; CPr2EH: propionyl and 2-ethylhexanoyl substituted cellulose ester or cellulose propionate 2-ethylhexanoate; CPr2EHBz: propionyl, 2-ethylhexanoyl and benzoyl substituted cellulose ester or cellulose propionate 2-ethylhexanoate benzoate; CPr2EHF: propionyl, 2-ethylhexanoyl and furanoyl substituted cellulose ester or cellulose propionate 2-ethylhexanoate furoate; CPr2EHNp: propionyl, 2-ethylhexanoyl and naphthoyl substituted cellulose ester or cellulose 2-ethylhexanoate naphthoate; CPrNp: propionyl and naphthoyl substituted cellulose ester or cellulose propionate naphthoate; CPrAcBz: propionyl acetyl and benzoyl substituted cellulose ester or cellulose propionate acetate benzoate; CCrBz: crotonyl benzoyl substituted cellulose ester or cellulose crotonate benzoate; CPrPvNp: propionyl, Pivaloyl and naphthoyl substituted cellulose ester or cellulose propionate pivalate naphthoate; DCM: dichloromethane; DEAMC: 7-diethylamino-4-methylcoumarin; DEP: diethyl phthalate; DHODPO: (2-hydroxy-4-methoxyphenyl)(2-hydroxyphenyl)methanone; BANE: 2-naphthyl benzoate; DMAC: dimethyl acetamide; DMSO: Dimethyl sulfoxide; DPDO: 1,3-diphenylpropane-1,3-dione; DS: average degree substitution; eq: equivalent(s); EtOH: ethanol; Ex: example(s); F: furan-2-CO—; FAk: first alkyl-acyl, Ak1 or first alkyl-CO—; FAr: first aryl-acyl or first aryl-CO—; FCl: furan-2-carbonyl chloride; g: gram; HODPO: (2-hydroxy-4-(octyloxy)phenyl)(phenyl)methanone; i-PrOH: iso-propanol; KOAc: potassium acetate; MEK: methyl ethyl ketone; hr or h: hour(s); L: liter; MeOH: methanol; min: minute(s); mL: milliliter; μm: micrometer or micron; mol: mole(s); mol eq: mole equivalent based on moles of anhydroglucose unit; NMP: N-Methylpyrrolidone; Np: naphthoyl; NpCl: naphthoyl chloride; Pr: propionyl; $Pr_2O$: propionic anhydride; PrCl: propionyl chloride; RBF: round bottom flask; RM: reaction mixture; SM: starting material; Int: intermediate; rt: room temperature; SAk: second alkyl-acyl or second alkyl-CO—; SAr: second aryl-acyl or second aryl-CO—; TBMADMP: tributylmethylammonium dimethylphosphate; Tot.: total; TFA: trifluoroacetic acid; TFAA: trifluoroacetic anhydride; UV: ultraviolet.

NMR Characterization: Proton NMR data were obtained on a JEOL Model Eclipse-600 NMR spectrometer operating at 600 MHz. The sample tube size was 5 mm, and the sample concentrations were ca. 20 mg/mL DMSO-$d_6$. Each spectrum was recorded at 80° C. using 64 scans and a 15 second pulse delay. One to two drops of trifluoroacetic acid-d were added to each sample to shift residual water from the spectral region of interest. Chemical shifts are reported in parts per million ("ppm") from tetramethylsilane with the center peak of DMSO-$d_6$ as an internal reference (2.49 ppm).

Quantitative $^{13}C$ NMR data were obtained on a JEOL Model GX-400 NMR spectrometer operating at 100 MHz. The sample tube size was 10 mm, and the sample concentrations were ca. 100 mg/mL DMSO-$d_6$. Chromium(III) acetylacetonate was added to each sample at 5 mg/100 mg cellulose ester as a relaxation agent. Each spectrum was typically recorded at 80° C. using 10000 scans and a 1 second pulse delay. Chemical shifts are reported in ppm from tetramethylsilane with the center peak of DMSO-$d_6$ as an internal reference (39.5 ppm).

The proton and carbon NMR assignments, the degree of substitution and the relative degree of substitution ("RDS") of the various acyl groups of the cellulose esters were determined by adapting the procedures disclosed in US 2012/0262650.

DMTA measurements were run DMA Q800 from TA Instruments with isothermal temperature set for 5 min followed by temperature ramp from 25° C. to 230° C. at 3° C./min. The oscillation strain was set at 0.1%.

The solutions of the cellulose esters for preparation of the films and the film preparation were made by adapting the procedures disclosed in US 2012/0262650.

Solution preparation for film casting: cellulose ester solids and additives were added to solvent to give a final concentration of 8-16 wt % based on the total weight of cellulose esters, component A and plasticizers. The mixture was sealed, placed on a roller, and mixed for 24 hours to create a uniform solution Percentages of component A and plasticizers in the films are defined as below. Percentage of component A or plasticizers=weight of component A or plasticizers/total weight of cellulose esters, component A, plasticizers and all other components added.

Solution concentration is defined as below. Solution concentration=total weight of (cellulose esters, component A, plasticizers and all other components added excluding solvents)/total weight of (cellulose esters, component A, plasticizers, all other components added and solvents).

Solvent used for solution preparation can be but are not limited to cyclopentanone (CPN), DCM, mixtures of DCM with acetone, ethanol or methanol such as acetone/DCM=10/90 (wt/wt), methanol/DCM=10/90 (wt/wt), methanol/DCM=5/95 and ethanol/DCM=10/90 (wt/wt), ethanol/DCM=5/95 (wt/wt).

Film castinq: The solution prepared above was cast onto a glass plate using a doctor blade to obtain a film with the desired thickness. Casting was conducted in a fume hood with relative humidity controlled at 45%-50%. After casting, if acetone/DCM=10/90 (wt/wt), methanol/DCM/methanol=10/90 (wt/wt) and ethanol/DCM=10/90 (wt/wt), methanol/DCM=5/95 (wt/wt), and ethanol/DCM=5/95 (wt/wt) were used as solvent, unless otherwise noted, the film was allowed to dry for 60 to 110 min under a cover pan to minimize rate of solvent evaporation before the pan was removed. The film was allowed to dry for 15 to 30 min then the film was peeled from the glass and annealed in a forced air oven for 10 min at 100° C. After annealing at 100° C., the film was annealed at a higher temperature (120° C.) for another 10 min. If CPN was used as solvent, unless otherwise noted, the film was dried under cover pan for 75 min before the pan was removed. The film was further dried for another 2 hour in the hood before the film was peeled from the glass and annealed in a forced air oven for 10 min at 100° C. After annealing at 100° C., the film was annealed at a higher temperature (130° C.) for another 10 min.

Film stretching: Film stretching was done by Bruckner Karo IV laboratory film stretcher. Stretching conditions, such as, stretch ratio, stretch temperature, pre-heating and post-annealing were varied to obtain specific optical retardation and dispersion according to the requirements of the application.

Optical measurements: Film optical retardation and dispersion measurements were made using a J. A. Woollam M-2000V Spectroscopic Ellipsometer having a spectral range from 370 to 1000 nm or J. A. Woollam RC2 Ellipsometer having a spectral range from 250-2500 nm. RetMeas (Retardation Measurement) program from J. A. Woollam Co., Inc. was used to obtain optical film in-plane ($R_e$) and out-of-plane ($R_{th}$) retardations. The thickness of the films was measured using a Metricon Prism Coupler 2010 (Metricon Corp.) or using a handheld Positector 6000. The haze and b* measurements were made using a HunterLab Ultrascan VIS colorimeter in diffused transmittance mode (1-inch diameter port).

Chemicals: DEP, Admex 523, Admex 525, Admex 760 and Admex 6995 were obtained from Eastman Chemical Company, 1,3-diphenylpropane-1,3-dione, (2-hydroxy-4-(octyloxy)phenyl)(phenyl)methanone, (2-hydroxy-4-methoxyphenyl)(2-hydroxyphenyl)methanone and 7-diethylamino-4-methylcoumarin were purchased from Millipore Sigma, (2-hydroxy-4-(octyloxy)phenyl)(phenyl)methanone was purchased from Alfa-Aesar, Avobenzone was purchased from Tokyo Chemical Industry Co., Ltd., Tinuvin 400, Tinuvin 405 and Tinuvin 1577 were purchased from Ciba Specialty Chemical Corp, Tinuvin 460 and Tinuvin 479 were purchased from BASF.

Example 1

To a 5-neck RBF was added TBMADMP (4405.2 g). The TBMADMP was heated to 100° C. (5 h) at 1.20-1.80 mm Hg. After removing the vacuum, NMP (1887.9 g, 30 wt %) was added to the RM, and the RM was cooled to rt. DPv 610 cellulose (473.3 g, 7 wt %) was added over a 20 min to the RM. The resulting RM was stirred for 55 min at rt. The mixture was stirred (6 h) at 100° C., stirred (3 h) at 30° C., and reheated to 102° C. To the RM was added $Pr_2O$ (456 g, 1.2 eq) over 67 min. After 46 min, $Bz_2O$ (2115 g (3.30 eq) was added to the RM over 20 min. The RM was stirred for 67 min, and chilled 30% $H_2O_2$ (45 mL) was added dropwise to the RM. Then the mixture was stirred for 30 min. The crude product was precipitated in a $MeOH/H_2O$ (95/5) solution, and the material was filtered, washed (5×) with MeOH, and dried in vacuo (55 mmHg, 50° C.) to give the titled product. Analysis by $^1H$ NMR: $DS_{Pr}$=1.64 and a $DS_{Bz}$=0.69. Analysis by $^{13}C$ NMR: C6DS=0.94, C3DS=0.56, C2DS=0.83. By integration of the benzoate carbonyl resonances $^{13}C$ NMR also showed that $C2DS_{Bz}$+C3DSBz−$C6DS_{Bz}$=0.39.

Example 2

Ex 2 was prepared by adapting the procedure for the preparation of Ex 1, using 3.35 eq, instead of 3.3 eq, of $Bz_2O$ instead.

TABLE 1

| Ex | Total DS | Al1 | Total $DS_{Al}$ | Ar | Total $DS_{Ar}$ | $C6DS_{Ar}$ |
|---|---|---|---|---|---|---|
| 1 | 2.33 | Pr | 1.64 | Bz | 0.69 | 0.15 |
| 2 | 2.40 | Pr | 1.64 | Bz | 0.76 | 0.17 |

| Ex | C2DS + $C3DS_{Ar}$ | (C2DS + C3DS) − $C6DS_{Ar}$ | C2DS | C3DS | C6DS |
|---|---|---|---|---|---|
| 1 | 0.54 | 0.39 | 0.83 | 0.56 | 0.94 |
| 2 | 0.54 | 0.42 | 0.83 | 0.59 | 0.98 |

Intermediate 1 (CPr, $DS_{pr}$=1.13)

To a 4-neck RBF, under a $N_2$ atm with overhead stirring and a bottom valve, was added iPrOH (259 g). The jacket was set at 41° C. To the reactor was added Eastman™ CAP 482-20 (60 g, 1 mol eq), and the RM was stirred for 40 min. To the RM was added $N_2H_4{\cdot}H_2O$ (18.0 g, 1.89 mol eq) in AcOH (4.63 g, 0.41 mol eq) and DMSO (259 g). The RM was stirred for 24 hr. The crude product was precipitated by the addition of water. The crude product was filtered with a wash bag and washed with copious amounts of water. The solid was transferred to an aluminum pan and dried in vacuo (60° C.) overnight to give the title compound. $^1H$ NMR, $^{13}C$ NMR: $DS_{pr}$=1.13, $DS_{OH}$=1.87, C2DS=0.26, C3DS=0.34, C6DS=0.53.

Intermediate 2 (CPr, $DS_{Pr}$=1.16)

Int 2 was prepared by adapting the procedure for the preparation of Int 1, except that except that $N_2H_4{\cdot}H_2O$ (1.87 mol eq) and AcOH (0.4 mol eq) were added to Eastman™

CAP482-20 (1.0 mol eq). $^1$H NMR, $^{13}$C NMR: $DS_{pr}$=1.16, $DS_{OH}$=1.84, C2DS=0.26, C3DS=0.32, $DS_{C6}$=0.57.

Intermediate 3 (CPr, $DS_{Pr}$=1.18)

Int 3 was prepared by adapting the procedure for the preparation of Int 1, except that $N_2H_4·H_2O$ (1.85 mol eq) and AcOH (0.4 mol eq) were added to Eastman™ CAP482-20 (1.0 mol eq). $^1$H NMR, $^{13}$C NMR: $DS_{pr}$=1.18, $DS_{OH}$=1.82, C2DS=0.28, C3DS=0.31, C6DS=0.59.

Intermediate 4 (CPr, $DS_{pr}$=1.40)

Int 4 was prepared by adapting the procedure for the preparation of Int 1, except that $N_2H_4·H_2O$ (1.57 mol eq) and AcOH (0.35 mol eq) were added to Eastman™ CAP482-20 (1.0 mol eq). $^1$H NMR, $^{13}$C NMR: $DS_{pr}$=1.40, $DS_{OH}$=1.60, C2DS=0.32, C3DS=0.44, $C6DS_{C6}$=0.63.

Intermediate 5 (CPr, $DS_{pr}$=1.64)

Int 5 was prepared by adapting the procedure for the preparation of Int 1, except that $N_2H_4·H_2O$ (1.25 mol eq) and AcOH (0.29 mol eq) were added to Eastman™ CAP482-20 (1.0 mol eq). $^1$H NMR, $^{13}$C NMR: $DS_{pr}$=1.64, $DS_{OH}$=1.36, C2DS=0.41, C3DS=0.52, C6DS=0.71.

Intermediate 6 (CPr, $DS_{pr}$=1.10)

Int 6 was prepared by adapting the procedure for the preparation of Int 1, except that $N_2H_4·H_2O$ (1.94 mol eq) and AcOH (0.42 mol eq) were added to Eastman™ CAP482-20 (1.0 eq). $^1$H NMR, $^{13}$C NMR: $DS_{pr}$=1.10, $DS_{OH}$=1.90, C2DS=0.23, C2DS=0.30, C6DS=0.58.

Intermediate 7 (CPr2EH, $DS_{pr}$=1.13 and $DS_{2EH}$=0.49)

To a 4-neck jacketed resin kettle reaction flask under a nitrogen atm with overhead mechanical stirring was added anhydrous DMAC (1.86 mol eq) and NMI (0.39 mol eq). Int 1 (0.089 mol eq) was added to the RM, and the RM was stirred (30° C.) for 48 h. Then 2-EHCl (0.52 mol eq) in DMAC (0.089 mol eq) was added dropwise over 25 min. The RM was stirred (70° C.) for 16 h, and the crude product was precipitated by the addition of water (4 L). The solid was collected, continuously washed with deionized water for 6 h, and dried in vacuo (55° C.) overnight to give the title compound. $^1$H NMR and $^{13}$C NMR: $DS_{Pr}$=1.13, $DS_{2EH}$=0.49, $DS_{OH}$=1.38, C2DS=0.38, C3DS=0.40, C6DS=0.85.

Intermediate 8 (Cellulose Acetate Proprionate, $DS_{Ac}$=0.17, $DS_{pr}$=1.66, $DS_{OH}$=1.17)

Int 8 was prepared as described in US20090096962A (Ex 18).

Intermediates 9 (CPr, $DS_{Pr}$=1.15) and 10 (Cellulose Propionate, $DS_{Pr}$=1.41)

Int 9 and 10 were synthesized by adapting the procedure for the synthesis of Int 1 by $N_2H_4H_2O$ and AcOH. The $DS_{Pr}$ was determined by $^1$H and $^{13}$C NMR.

Example 3 (CPrBz, $Ds_{Pr}$=1.15, $Ds_{Bz}$=1.13)

To a stirred mixture RB flask containing DMAC (172 mL, 21.2 mol eq) and 1-methylimidazole (32 mL, 4.5 mol eq.) in a nitrogen atm, was added Int 2 (20 g, 1.0 mol eq) which was dried in vacuo overnight. The RM was stirred for 4 h at 50° C., cooled to 26° C., and then BzCl (14.2 g, 1.15 mol eq in DMAC (14 mL)) was slowly added into the RM over 1 h. The RM was stirred for 14 h at 26° C. The crude product was precipitated iPrOH (2.2 L), and the solids was washed with water (2×500 mL), washed continuously with deionized water for 5 h, and dried in vacuo overnight to provide the title compound. $^1$H NMR and $^{13}$C NMR: $DS_{Pr}$=1.15, $DS_{Bz}$=1.13 (Table 3).

Ex 4-Ex 11 and Ex 25 were prepared by adapting the procedure for the preparation of Ex 3 except different SM and BzCl levels were used as shown in Table 2. The compounds were characterized with $^1$H NMR and $^{13}$C NMR as shown in Table 3.

Table 2 provides the preparation conditions of Ex 3-11.

TABLE 2 provides the preparation conditions of Ex 3-11.

| EX # | SM (Int #) | $DS_{Pr}$ of SM | BzCl (mol eq) |
|---|---|---|---|
| 3 | 9 | 1.15 | 1.15 |
| 4 | 9 | 1.15 | 1.15 |
| 5 | 6 | 1.10 | 1.15 |
| 6 | 1 | 1.13 | 1.02 |
| 7 | 5 | 1.64 | 0.85 |
| 8 | 4 | 1.40 | 1.00 |
| 9 | 3 | 1.18 | 1.12 |
| 10 | 10 | 1.41 | 0.98 |
| 11 | 10 | 1.41 | 1.00 |
| 25 | 3 | 1.18 | 1.30 |

Table 3 provides the NMR characterization of Ex 3-11 and Ex 25. doesn't work was prepared by adapting the procedures described herein.

TABLE 3

| Ex | Total DS | $C2DS_{Pr}$, $C3DS_{Pr}$, $C6DS_{Pr}$ | Total $DS_{Pr}$ | Total $DS_{Bz}$ | $C2DS_{Bz}$, $C3DS_{Bz}$, $C6DS_{Bz}$ | $C2DS_{Bz}$ + $C3DS_{Bz}$ | ($C2DS_{Bz}$ + $C3DS_{Bz}$) − $C6DS_{Bz}$ |
|---|---|---|---|---|---|---|---|
| 3 | 2.28 | 0.26, 0.32, 0.57 | 1.15 | 1.13 | 0.49, 0.21, 0.43 | 0.70 | 0.28 |
| 4 | 2.18 | 0.27, 0.30, 0.59 | 1.15 | 1.03 | 0.43, 0.21, 0.39 | 0.64 | 0.24 |
| 5 | 2.22 | 0.25, 0.29, 0.56 | 1.10 | 1.12 | 0.46, 0.23, 0.43 | 0.69 | 0.26 |
| 6 | 2.10 | 0.26, 0.34, 0.53 | 1.13 | 0.97 | 0.38, 0.14, 0.45 | 0.52 | 0.08 |
| 7 | 2.45 | 0.41, 0.52, 0.71 | 1.64 | 0.81 | 0.38, 0.14, 0.29 | 0.52 | 0.24 |
| 8 | 2.33 | 0.32, 0.44, 0.63 | 1.40 | 0.93 | 0.44, 0.15, 0.34 | 0.59 | 0.24 |
| 9 | 2.28 | 0.28, 0.31, 0.59 | 1.18 | 1.10 | 0.47, 0.19, 0.43, | 0.67 | 0.24 |
| 10 | 2.38 | 0.34, 0.42, 0.65 | 1.41 | 0.97 | 0.45, 0.16, 0.37, | 0.60 | 0.24 |
| 11 | 2.38 | 0.34, 0.42, 0.65 | 1.41 | 0.97 | 0.43, 0.20, 0.34, | 0.63 | 0.30 |
| 25 | 2.46 | 0.28, 0.31, 0.59 | 1.18 | 1.28 | 0.57, 0.28, 0.43 | 0.85 | 0.42 |

Example 12 (CPrAcBz, $Ds_{Pr}$=1 0.66, $Ds_{Ac}$=0.17, $Ds_{Bz}$=0.86)

Ex 12 was prepared by adapting the procedure for the preparation of Ex 3, except that Int 8, (1.0 eq, 20 g, CAcPr, $DS_{Ac}$ 0.17 and $DS_{Pr}$=1.66) and BzCl (10.2 g, 0.95 eq) was used. $^1$H NMR and $^{13}$C NMR: $DS_{Pr}$=1.66, $DS_{Ac}$=0.17, $DS_{Bz}$=0.86 (Table 4).

Table 4 provides the NMR characterization of Ex 12.

TABLE 4

| Ex | Tot. DS | Tot. $DS_{Pr}$ | Tot. $DS_{Ac}$ | $C2DS_{Bz}$, $C3DS_{Bz}$, $CSDS_{Bz}$ | Tot. $DS_{Bz}$ | $C2DS_{Bz}$ + $C3DS_{Bz}$ | ($C2DS_{Bz}$ + $C3DS_{Bz}$) − $C6DS_{Bz}$ |
|---|---|---|---|---|---|---|---|
| 12 | 2.69 | 1.66 | 0.17 | 0.30, 0.13, 0.43 | 0.86 | 0.43 | 0.00 |

Examples 13 (CPr2EHBz, $Ds_{Pr}$=1.13, $Ds_{Ac}$=0.49, $Ds_{Bz}$=0.96) and 14 (CPr2EHBz, $Ds_{Pr}$=1.13, $Ds_{Ac}$=0.49, $Ds_{Bz}$=1.02)

Ex 13 and 14 were prepared by adapting the procedure for the preparation of Ex 3. For Ex 13, Int 7 (10 g, 1.0 mol eq) and BzCl (5.1 g, 0.98 mol eq) were used, and for Ex 14, Int 7 (10 g, 1.0 mol eq) and BzCl (0.97 mol eq) were used.

Table 5 provides the NMR characterization of Ex 13 and 14.

TABLE 5

| Ex | Tot. DS | $C2DS_{Pr}$, $C3DS_{Pr}$, $C6DS_{Pr}$ | $C2DS2_{EH}$, $C3DS2_{EH}$, $C6DS2_{EH}$ | Tot. $DS_{Pr}$/Tot. $DS_{2EH}$ | $C2DS_{Bz}$, $C3DS_{Bz}$, $C6DS_{Bz}$ | Tot. $DS_{Bz}$ | $C2DS_{Bz}$ + $C3DS_{Bz}$ | ($C2DS_{Bz}$ + $C3DS_{Bz}$) − $C6DS_{Bz}$ |
|---|---|---|---|---|---|---|---|---|
| 13 | 2.58 | 0.26, 0.34, 0.53 | 0.12, 0.06, 0.32 | 1.13/0.49 | 0.56, 0.23, 0.16 | 0.96 | 0.79 | 0.62 |
| 14 | 2.64 | 0.26, 0.34, 0.53 | 0.12, 0.06, 0.32 | 1.13/0.49 | 0.56, 0.28, 0.16 | 1.02 | 0.84 | 0.68 |

Example 15 (CPrBz, $Ds_{Pr}$=1.54, $Ds_{Bz}$=0.63)

Ex 15 was prepared by adapting the procedure for preparation of Ex 3, except that Int 1 was used. After Int 1 (20 g, 1.0 mol eq) was fully dissolved, BzCl (1.87 g, 0.15 mol eq) in DMAC (2 mL) was added over 1 h at 26° C., and the RM was stirred for 1 h. at 26° C. Then PrCl (3.95 g, 0.5 mol eq) in DMAC (3.7 mL) was added over 1 h at 26° C. and stirred for 1 h. Then BzCl (6.09 g, 0.5 mol eq) in DMAC (5 mL) was added over 1 h at 26° C., and the RM was stirred for 14 h. The product was purified as described in the procedure for the preparation of Ex 3.

Example 16 (CPrBz, $Ds_{Pr}$=1.69, $Ds_{Bz}$=0.63)

Ex 16 was prepared according to the procedure for the preparation of Ex 15 (Ex 3), except that after Int 1 (20 g, 1.0 mol eq) was fully dissolved, PrCl (4.5 g, 0.5 mol eq) in DMAC (5 mL) was added over 1 h at 26° C., and the RM was stirred for 1 h at 26° C. Then BzCl (8.44 g, 0.68 mol eq) in DMAC (9 mL) was added over 1 h at 26° C., and stirred for 14 h at 26° C. The title compound was isolated and purified according to the procedure for the preparation of Ex 3.

Example 17 (CPrNp, $Ds_{Pr}$=1.68, $Ds_{Np}$=0.46)

Ex 17 was prepared by adapting the procedure for the preparation of Ex 16, except that Int 3 was used. After Int 3 (20 g, 1 mol eq) was fully dissolved, PrCl (4.45 g, 0.55 mol eq) in DMAC (4.75 mL) was added over 1 h at 26° C., and the RM was stirred for 1 h at 26° C. Then NpCl (0.5 mol eq) in DMAC (8.6 mL) was added over 1 h at 26° C., and the RM was stirred for 14 h at 26° C. The title compound was isolated and purified as described in the procedure for the preparation of Ex 3.

Example 24 (CPrBz, $Ds_{Pr}$=1.60, $Ds_{Bz}$=0.92)

EX 24 was prepared was prepared according to the procedure for the preparation of Ex 15, except that Int 3 was used. After Int 3 (20 g, 1.0 mol eq) was fully dissolved, PrCl (3.85 g, 0.45 mol eq) in DMAC (5 mL) was added over 1 h at 26° C., and the RM was stirred for 1 h at 26° C. Then BzCl (10.72 g, 0.90 mol eq) in DMAC (9 mL) was added over 1 h at 26° C., and stirred for 14 h at 26° C. The title compound was isolated and purified according to the procedure for the preparation of Ex 3.

Table 6 provides the NMR characterization of Ex 15-17, and Ex 24. Ex 24 were prepared by adapting the procedures described in this application.

TABLE 6

| Ex | Tot. DS | $C2DS_{Pr}$, $C3DS_{Pr}$, $C6DS_{Pr}$, Tot. $DS_{Pr}$ | ArCO | $C2DS_{ArCO}$, $C3DS_{ArCO}$, $C6DS_{ArCO}$, Tot. $DSA_{rCO}$ | $C2DS_{ArCO}$ + $C3DS_{ArCO}$ | ($C2DS_{ArCO}$ + $C3DS_{ArCO}$) − $C6DS_{ArCO}$ |
|---|---|---|---|---|---|---|
| 15 | 2.22 | 0.39, 0.37, 0.78, 1.54 | Bz | 0.33, 0.11, 0.19, 0.63 | 0.44 | 0.25 |
| 16 | 2.27 | 0.43, 0.41, 0.84, 1.69 | Bz | 0.38, 0.13, 0.12, 0.63 | 0.49 | 0.39 |
| 17 | 2.14 | 0.41, 0.41, 0.86, 1.68 | Np | 0.29, 0.05, 0.12, 0.46 | 0.34 | 0.22 |
| 24 | 2.53 | 0.39, 0.39, 0.84, 1.62 | Bz | 0.50, 0.23, 0.17, 0.90 | 0.73 | 0.56 |

Example 18 (CPr2EHF, $Ds_{Pr}$=1.18, $Ds_{2EH}$=0.36, $Ds_{F}$=0.99)

Int 3 (115 g, 1 mol eq) was added to a mixture of DMAC (931 g) and NMI (186 g) under a nitrogen atm in a 4-neck resin kettle containing, and the RM was stirred for 4 h at 32° C. The RM was cooled to 26° C., and 2-EHCl (31.93 g, 0.4 mol eq) dropwise over 60 min, and the RM was stirred at 26° C. for 2 h. Then FCl (71.65 g, 1.09 mol eq based on Int 3) in DMAC (85 g) was dropwise over 120 min, and the RM was stirred for 12 h at 26° C. The crude product was precipitated with MeOH (2 L), then the solid was filtered and washed continuously with deionized water for 5 h. The material was dried in vacuo overnight at 55° C. to provide the title compound. $^{1}H$ NMR, $^{13}C$ NMR: $DS_{Pr}$=1.18, $DS_{2EH}$=0.36; $DS_{F}$=0.99; $DS_{OH}$=0.51; C2DS=0.88; C3DS=0.65; C6DS=0.97.

Table 7 provides the NMR characterization of Ex 18.

TABLE 7

| Ex | Tot. DS | $DS_{Pr}$ | $DS_{2EH}$ | $DS_F$ | C2DS | C3DS | C6DS |
|---|---|---|---|---|---|---|---|
| 18 | 2.55 | 1.18 | 0.36 | 0.99 | 0.88 | 0.65 | 0.97 |

Example 19 (CCrBz, $Ds_{Cr}$=1.39, $Ds_{Bz}$=1.33)

General procedure was described in Application WO2019190756A1 (Preparation of Intermediate 1 and Example 1).

Step (1) Preparation of Intermediate 11 Cellulose Crotonate

1ARY cellulose pulp (70 g, 1.0 eq 5 wt. %) was added to a cooled (25° C.) jacketed reaction kettle. Then a solution of TFAA (151 g, 1.67 mol eq) in trifluoroacetic acid (1180 g, 24 eq) was added to the cooled cellulose solid with overhead stirring. After the addition was complete, the RM was heated at 55° C., stirred for 16 hr, and then cooled to rt. Then, a solution of trans-crotonic acid (52.0 g, 1.4 mol eq), TFA (10 mL), and trifluoroacetic anhydride (154 g, 1.7 mol eq) was prepared and stirred for 45 min. The resulting reagent mixture was added to the RM at rt, and the resulting RM was stirred for 8 h. The RM was treated with deionized water (1000 mL) to provide a solid material which was filtered. The solids were suspended in iPrOH and stirred for 30 min and mixture was filtered. The resulting solids were suspended in aq. KOAc (5 M, 2000 mL) and stirred for 36 h. The solids were collected by filtration and washed continuously with deionized water for 8 h, and dried in vacuo (60° C., 12 h) to give the title intermediate. $^1$H NMR, 13C NMR: $DS_{cr}$=1.39, $DS_{OH}$=1.61, C2DS=0.61, C3DS=0.72, C6DS=0.05.

Step 2, Preparation of Example 19 Cellulose Crotonate Benzoate

To an oven-dried 1000 mL jacketed 3-neck round bottomed flask equipped with a mechanical stirrer, Int 11 (20 g, 1.0 mol eq) followed by pyridine (150 mL) and dimethylacetamide (50 mL) were added to a jacketed round bottom flask under a $N_2$ atm. was charged using a solids addition funnel under an atm of nitrogen. The RM was heated to 50° C. and the mixture was stirred until dissolution of the solids, and then the RM was cooled to 25° C. BzCl (15.08 g, 1.4 eq) was then added over 2 min at 25° C. and the RM was stirred for 30 min followed by stirring at 50° C. overnight. Acetone (~150 mL) was added to the RM followed by deionized water (2200 mL) to precipitate the crude product. The crude product was filtered and washed with a 1:1 solution of iPrOH:water (2×). The crude product was washed with deionized water continuously for at least 5 h, the solids were filter collected and dried in vacuo (22.5 mm Hg, 60° C.) overnight. $^1$H NMR, $^{13}$C NMR: $DS_{Cr}$=1.39, $DS_{Bz}$=1.33, $DS_{OH}$=0.29, C2DS=0.83, C3DS=0.89, C6DS=0.99.

Example 20 (CPrBz, $Ds_{Pr}$=1.81, $Ds_{Bz}$=0.68)

Ex 20 was prepared by adapting the procedure for the synthesis of Ex 19, except that in Step 1 in the preparation of Int 12 Cellulose Propionate Benzoate, BzOH (0.5 mol eq), $TF_2O$ (0.8 mol eq), TFA (10 mL) after stirring for 45 min together were used, and the resulting reagent mixture was added to the reaction mixture and the RM was stirred (45° C.) for 3 h. Afterwards, propionic acid (0.8 mol eq) $TF_2O$ (0.8 mol eq) and TFA (10 mL) were stirred for 45 min, the resulting reagent solution was added to the RM, and the resulting RM was stirred for 5 h. The Int 12 was obtained after using the work-up described in step 1 for Ex 19. The mixture was added into the reaction kettle at 45° C. after the addition of the first mixed anhydride was added and stirred for 3 h. The reaction was allowed to stir for 5 h. $^1$H NMR, $^{13}$C NMR: $DS_{Pr}$=0.81, $DS_{Bz}$=0.52, $DS_{OH}$=1.67, C2DS=0.64, C3DS=0.63, C6DS=0.05.

In Step 2, Int 12 (1.0 mol eq) and BzCl (0.15 mol eq) were stirred for 3 h at rt, and then propionic anhydride (1 mol eq) were stirred overnight at 50° C. The title product was isolated as described in step 2 for Ex 19. $^1$H NMR and $^{13}$C NMR: $DS_{Pr}$=1.81, $DS_{Bz}$=0.68, $DS_{OH}$=0.51, C2DS=0.86, C3DS=0.76, C6DS=0.87.

Table 8 provides the NMR characterization of Ex 19-20.

TABLE 8

| Ex | Tot. DS | FAk | $C2DS_{FAk}$, $C3DS_{FAk}$, $C6DS_{FAk}$, Tot $DS_{FAK}$ | $C2DS_{Bz}$, $C3DS_{Bz}$, $C6DS_{Bz}$, Tot. $DS_{Bz}$ | $C2DS_{Bz}$ + $C3DS_{Bz}$ | ($C2DS_{Bz}$ + $C3DS_{Bz}$) − $C6DS_{Bz}$ |
|---|---|---|---|---|---|---|
| 19 | 2.71 | Cr | 0.61, 0.72, 0.05, 1.39 | 0.22, 0.17, 0.94, 1.33 | 0.39 | −0.54 |
| 20 | 2.49 | Pr | —, —, —, 1.81 | —, —, —, 0.68 | — | — |

Example 21, Cellulose Propionate Pivalate Naphthoate CPrPvNp ($Ds_{Pr}$=1.18, $Ds_{Pv}$=0.39, $Ds_{Np}$=1.18)

Ex 21 was prepared as described in US20170306054 (Ex 12, Table 3).

Example 22, Cellulose Propionate 2-ethylhexaonate Naphthoate CPr2EHNp ($Ds_{Pr}$=1.18, $Ds_{2EH}$=0.40, $Ds_{Np}$=1.26)

Ex 22 was prepared according to the procedure described in U.S. Application No. 62/891,561 (Ex 7, Table 9).

Table 9 provides the NMR characterization of Ex 21-22.

TABLE 9

| Ex | Tot. DS | Tot. $DS_{Np}$ | FAk/ SAk | Tot. $DS_{FAk}/DS_{SAk}$ | C2DS | C3DS | C6DS |
|---|---|---|---|---|---|---|---|
| 21 | 2.75 | 1.18 | Pr/PV | 1.18/0.39 | — | — | — |
| 22 | 2.84 | 1.26 | Pr/2EH | 1.18/0.4 | 1.00 | 0.77 | 1.00 |

Film Casting and Stretching

Table 10 provides the general film compositions, with or without component A; solvent system used to prepare casting solutions; temperature used to stretch the cast films, if stretched; and the stretch ratios for the films. The stretch ratio is provided with either an "x" or a "c." An "x" indicates that the films were stretched along the machine direction with two sides held and the other two sides free. A "c" indicates that the films were stretched along the machine direction with all four sides held. For example, casting solutions made with cellulose ester, Ex 1, and with or without Component A (0-20 wt %) were prepared in a 10% acetone in DCM solution.

Regarding Films 18.1-18.4, Films 21.1-21.3, and Films 22.1-22.3, the corresponding resin and Component A dissolved in corresponding solvent to prepare corresponding Solution A. Solution of Eastman™ CAP482-20 (90 wt %) and TPP (10 wt %) in 1:9 EtOH/DCM at solid wt % of 12 wt % was prepared. Solution of CAP482-20 was casted on to glass substrate in a fume hood with relative humidity controlled at 45%-50%. The films were allowed to dry for 45 minutes under a cover pan to minimize rate of solvent evaporation before the pan was removed. Corresponding solution A was casted on to Eastman CAP482-20 films. The two-layer films were allowed to dry for 45 minutes under a cover pan to minimize rate of solvent evaporation before the pan was removed and further to dry for 15 minutes after the pan was removed. Then the two-layer films were peeled from the glass and annealed in a forced air oven for 10 minutes at 100° C. After annealing at 100° C., the film was annealed at a higher temperature (120° C.) for another 10 minutes.

After the two-layer films were stretched, the top layers were peeled off the bottom layers and measured.

Table 10 provides the components of corresponding solutions and stretching conditions of example films.

Percentages of component A and plasticizers in the films are defined as below. Percentage of component A or plasticizers=weight of component A or plasticizers/total weight of (cellulose esters, component A, plasticizers and all other components added).

Solution concentration is defined as below. Solution concentration=total weight of (cellulose esters, component A, plasticizers and all other components added excluding solvents)/total weight of (cellulose esters, component A, plasticizers, all other components added and solvents)

For example, for film 1.3, Resin 1 (8 g, 95 wt %) and Component A (0.421 g, 5 wt %) was added into 1:9 Acetone/DCM (75.8 g, concentration at 10 wt %). The mixture was put on roller until the Resin 1 and Component A were fully dissolved.

For example, for film 25.2, Resin 25 (15 g, 88 wt %), Component A (1.19 g, 7 wt %) and plasticizer Admex 523 (0.85 g, 5 wt %) were added into 5:95 MeOH/DCM (104.7 g, concentration at 14 wt %). The mixture was put on roller until the Resin 1, Component A and plasticizer were fully dissolved.

TABLE 10

| Film | Resin | Solvent | Component A | wt % Component A | stretch temperature (° C.) | stretch ratio |
|---|---|---|---|---|---|---|
| 1.1 | 1 | 1:9 Acetone/DCM | — | — | 195 | 1.4 x |
| 1.2 | 1 | 1:9 Acetone/DCM | — | — | 195 | 1.4 c |
| 1.3 | 1 | 1:9 Acetone/DCM | Avobenzone | 5 | 190 | 1.55 x |
| 1.4 | 1 | 1:9 Acetone/DCM | Avobenzone | 5 | 190 | 1.4 c |
| 1.5 | 1 | 1:9 Acetone/DCM | Avobenzone | 7 | 185 | 1.3 x |
| 1.6 | 1 | 1:9 Acetone/DCM | Avobenzone | 7 | 185 | 1.5 c |
| 1.7 | 1 | 1:9 Acetone/DCM | Tinuvin 1577 | 5 | 195 | 1.4 x |
| 1.8 | 1 | 1:9 Acetone/DCM | Tinuvin 1577 | 5 | 195 | 1.4 c |
| 1.9 | 1 | 1:9 Acetone/DCM | Tinuvin 405 | 10 | 185 | 1.4 c |
| 1.10 | 1 | 1:9 Acetone/DCM | Tinuvin 405 | 10 | 185 | 1.4 x |
| 1.11 | 1 | 1:9 Acetone/DCM | Tinuvin 460 | 5 | 185 | 1.4 x |
| 1.12 | 1 | 1:9 Acetone/DCM | Tinuvin 460 | 5 | 185 | 1.3 c |
| 1.13 | 1 | 1:9 Acetone/DCM | Tinuvin 479 | 5 | 185 | 1.4 x |
| 1.14 | 1 | 1:9 Acetone/DCM | Tinuvin 479 | 5 | 185 | 1.4 c |
| 1.15 | 1 | 1:9 Acetone/DCM | HODPO | 10 | 175 | 1.4 x |
| 1.16 | 1 | 1:9 Acetone/DCM | HODPO | 10 | 175 | 1.3c |
| 1.17 | 1 | 1:9 Acetone/DCM | HODPO | 20 | 160 | 1.35 x |
| 1.18 | 1 | 1:9 Acetone/DCM | HODPO | 20 | 160 | 1.4 c |
| 1.19 | 1 | 1:9 Acetone/DCM | DEAMC | 20 | 160 | 1.35 x |
| 2.1 | 2 | 1:9 Acetone/DCM | — | — | 195 | 1.4 x |
| 2.2 | 2 | 1:9 Acetone/DCM | — | — | 195 | 1.4 c |
| 2.3 | 2 | 1:9 Acetone/DCM | DEP | 10 | 185 | 1.7 x |
| 2.4 | 2 | 1:9 Acetone/DCM | DEP | 10 | 185 | 1.5 c |
| 2.5 | 2 | 1:9 Acetone/DCM | Avobenzone | 5 | 190 | 1.4 x |
| 2.6 | 2 | 1:9 Acetone/DCM | Avobenzone | 5 | 190 | 1.5 c |
| 3.1 | 3 | 1:9 Acetone/DCM | DEP | 10 | 175 | 1.4 x |
| 3.2 | 3 | 1:9 Acetone/DCM | DEP | 10 | 175 | 1.3 c |
| 3.3 | 3 | 1:9 Acetone/DCM | Avobenzone | 5 | 175 | 1.3 c |
| 3.4 | 3 | 1:9 Acetone/DCM | Avobenzone | 5 | 175 | 1.4 x |
| 3.5 | 3 | 1:9 Acetone/DCM | Tinuvin 460 | 6 | 175 | 1.3 x |
| 4.1 | 4 | 1:9 Acetone/DCM | — | — | 195 | 1.4 x |
| 4.2 | 4 | 1:9 Acetone/DCM | — | — | 195 | 1.3 c |
| 4.3 | 4 | 1:9 Acetone/DCM | DEP | 10 | 185 | 1.4 x |
| 4.4 | 4 | 1:9 Acetone/DCM | DEP | 10 | 185 | 1.3 c |
| 4.5 | 4 | 1:9 Acetone/DCM | Avobenzone | 5 | 175 | 1.4 x |
| 4.6 | 4 | 1:9 Acetone/DCM | Avobenzone | 5 | 185 | 1.3 c |
| 4.7 | 4 | 1:9 Acetone/DCM | Avobenzone | 5 | 185 | 1.4 c |
| 5.1 | 5 | CPN | DEP | 10 | 165 | 1.3 c |
| 5.2 | 5 | CPN | DEP | 10 | 165 | 1.4 x |
| 5.3 | 5 | CPN | Avobenzone | 5 | 175 | 1.4 x |
| 5.4 | 5 | CPN | Avobenzone | 5 | 175 | 1.4 c |
| 6.1 | 6 | CPN | DEP | 10 | 175 | 1.4 x |
| 6.2 | 6 | CPN | DEP | 10 | 175 | 1.3 c |
| 6.3 | 6 | CPN | Avobenzone | 5 | 180 | 1.4 x |
| 6.4 | 6 | CPN | Avobenzone | 5 | 180 | 1.3 c |
| 7.1 | 7 | CPN | — | — | 175 | 1.35 c |
| 7.2 | 7 | CPN | DEP | 10 | 155 | 1.5 c |
| 7.3 | 7 | CPN | DEP | 10 | 155 | 1.5 x |
| 7.4 | 7 | CPN | Avobenzone | 5 | 160 | 1.4 c |

TABLE 10-continued

| Film | Resin | Solvent | Component A | wt % Component A | stretch temperature (° C.) | stretch ratio |
|---|---|---|---|---|---|---|
| 7.5 | 7 | CPN | Avobenzone | 5 | 160 | 1.4 x |
| 8.1 | 8 | 1:9 Acetone/DCM | DEP | 10 | 175 | 1.5 c |
| 8.2 | 8 | 1:9 Acetone/DCM | DEP | 10 | 175 | 1.4 x |
| 8.3 | 8 | 1:9 Acetone/DCM | Avobenzone | 5 | 180 | 1.5 c |
| 8.4 | 8 | 1:9 Acetone/DCM | Avobenzone | 5 | 175 | 1.4 c |
| 9.1 | 9 | 1:9 Acetone/DCM | Avobenzone | 5 | 170 | 1.45 c |
| 9.2 | 9 | 1:9 Acetone/DCM | Avobenzone | 5 | 175 | 1.4 c |
| 9.3 | 9 | 1:9 Acetone/DCM | Avobenzone | 5 | 175 | 1.4 x |
| 10.1 | 10 | 1:9 Acetone/DCM | Avobenzone | 5 | 170 | 1.5 c |
| 10.2 | 10 | 1:9 Acetone/DCM | Avobenzone | 5 | 170 | 1.4 c |
| 10.3 | 10 | 1:9 Acetone/DCM | Avobenzone | 5 | 170 | 1.5 x |
| 11.1 | 11 | 1:9 Acetone/DCM | Avobenzone | 7 | 170 | 1.4 x |
| 11.2 | 11 | 1:9 Acetone/DCM | Avobenzone | 7 | 170 | 1.35 c |
| 11.3 | 11 | 1:9 Acetone/DCM | DHODPO | 20 | 150 | 1.4 x |
| 11.4 | 11 | 1:9 Acetone/DCM | DHODPO | 20 | 150 | 1.4 c |
| 12.1 | 12 | 1:9 Acetone/DCM | DEP | 10 | 145 | 1.45 c |
| 12.2 | 12 | 1:9 Acetone/DCM | DEP | 10 | 145 | 1.4 x |
| 12.3 | 12 | 1:9 Acetone/DCM | Avobenzone | 5 | 140 | 1.4 x |
| 12.4 | 12 | 1:9 Acetone/DCM | Avobenzone | 5 | 140 | 1.3 c |
| 12.5 | 12 | 1:9 Acetone/DCM | 4,4,4-Trifluoro-1-(2-naphthyl)-1,3-butanedione | 5 | 150 | 1.3 c |
| 13.1 | 13 | 1:9 Acetone/DCM | — | — | 175 | 1.3 c |
| 13.2 | 13 | 1:9 Acetone/DCM | — | — | 170 | 1.3 x |
| 13.3 | 13 | 1:9 Acetone/DCM | Tinuvin 1577 | 5 | 165 | 1.4 c |
| 13.4 | 13 | 1:9 Acetone/DCM | Tinuvin 1577 | 5 | 165 | 1.6 x |
| 14.1 | 14 | 1:9 Acetone/DCM | — | — | 175 | 1.4 c |
| 14.2 | 14 | 1:9 Acetone/DCM | — | — | 170 | 1.4 x |
| 14.3 | 14 | 1:9 Acetone/DCM | Avobenzone | 7 | 145 | 1.5 c |
| 14.4 | 14 | 1:9 Acetone/DCM | Avobenzone | 7 | 145 | 1.4 x |
| 15.1 | 15 | 1:9 EtOH/DCM | DEP | 10 | 175 | 1.4 c |
| 15.2 | 15 | 1:9 EtOH/DCM | DEP | 10 | 165 | 1.4 x |
| 15.3 | 15 | 1:9 EtOH/DCM | Avobenzone | 5 | 175 | 1.4 x |
| 16.1 | 16 | CPN | | | 185 | 1 3 c |
| 16.2 | 16 | CPN | Avobenzone | 5 | 175 | 1.3 c |
| 16.3 | 16 | CPN | Avobenzone | 5 | 175 | 1.45 c |
| 17.1 | 17 | 1:9 Acetone/DCM | — | — | 195 | 1.2 c |
| 17.2 | 17 | 1:9 Acetone/DCM | | —— | 185 | 1.2x |
| 17.3 | 17 | 1:9 Acetone/DCM | Avobenzone | 5 | 185 | 1.4 x |
| 17.4 | 17 | 1:9 Acetone/DCM | Avobenzone | 5 | 185 | 1.3 c |
| 17.5 | 17 | 1:9 Acetone/DCM | Avobenzone | 9 | 175 | 1.3 x |
| 17.6 | 17 | 1:9 Acetone/DCM | Avobenzone | 15 | 165 | 1.4 x |
| 17.7 | 17 | 1:9 Acetone/DCM | Avobenzone | 15 | 165 | 1.3 c |
| 18.1 | 18 | 1:9 EtOH/DCM | | —— | 135 | 1.3 x |
| 18.2 | 18 | 1:9 EtOH/DCM | Avobenzone | 10 | 140 | 1.35 x |
| 18.3 | 18 | 1:9 EtOH/DCM | Tinuvin 479 | 10 | 140 | 1.25 x |
| 18.4 | 18 | 1:9 EtOH/DCM | Avobenzone | 15 | 130 | 1.3 x |
| 19.1 | 19 | 1:9 Acetone/DCM | DEP | 10 | 160 | 1.4 c |
| 19.2 | 19 | 1:9 Acetone/DCM | DEP | 10 | 160 | 1.5 x |
| 19.3 | 19 | 1:9 Acetone/DCM | Avobenzone | 5 | 160 | 1.35 c |
| 19.4 | 19 | 1:9 Acetone/DCM | Avobenzone | 5 | 160 | 1.4 x |
| 19.5 | 19 | 1:9 Acetone/DCM | Tinuvin 1577 | 5 | 185 | 1.4 c |
| 19.6 | 19 | 1:9 Acetone/DCM | Tinuvin 1577 | 5 | 185 | 1.3 x |
| 20.1 | 20 | 1:9 Acetone/DCM | DEP | 10 | 170 | 1.3 |
| 20.2 | 20 | 1:9 Acetone/DCM | DEP | 10 | 170 | 1.3 c |
| 20.3 | 20 | 1:9 Acetone/DCM | DPDO | 10 | 175 | 1.4 x |
| 21.1 | 21 | 1:9 EtOH/DCM | — | — | 130 | 1.4 x |
| 21.2 | 21 | 1:9 EtOH/DCM | Avobenzone | 10 | 130 | 1.4 x |
| 21.3 | 21 | 1:9 EtOH/DCM | Tinuvin 460 | 10 | 145 | 1.3 x |
| 22.1 | 22 | 1:9 EiOH/DCM | — | — | 130 | 1.3x |
| 22.2 | 22 | 1:9 EtOH/DCM | Tinuvin 1577 | 10 | 130 | 1.3 x |
| 22.3 | 22 | 1:9 EtOH/DCM | Avobenzone | 10 | 120 | 1.4 x |
| 24.1 | 24 | 5:95 EtOH/DCM | Tinuvin 479 | 7 | 175 | 1.4 c |
| 25.1 | 25 | 5:95 EtOH/DCM | Tinuvin 479 | 7 | 175 | 1.35 c |

As shown in Table 11, compared to the corresponding control film samples with negative birefringence or retardation, the invention film samples showed improved wavelength dispersion with negative birefringence or retardation. For examples, Film 1.1 and Film 1.2 (control samples) have $R_e$(450 nm)/$R_e$(550 nm) between 1.13 to 1.15 and $R_e$(650 nm)/$R_e$(550 nm) between 0.93 to 0.94. Film 1.3 to 1.14 and Film 1.18 to 1.19 have improved wavelength dispersion with $R_e$(450 nm)/$R_e$(550 nm) between 0.69 to 1.06 and $R_e$(650 nm)/$R_e$(550 nm) between 0.95 to 1.02. Film 1.3, Film 1.11 and Film 1.13 have $R_e$(450 nm)/$R_e$(550 nm) between 0.91 to 0.93 and $R_e$(650 nm)/$R_e$(550 nm) at 0.98. Film 1.5 and 1.6 showed further tuned wavelength dispersion with $R_e$(450 nm)/$R_e$(550 nm) between 0.69 to 0.78 and $R_e$(650 nm)/$R_e$ (550 nm) from 1.01 to 1.02.

As shown in Table 11, the invention film samples have $N_z$ coefficient from −3.0 to 3.0 with improved wavelength dispersion. Specifically, Film 1.5, 1.7, 1.10, 1.11, 2.6, 3.3, 3.5, 4.5, 4.6, 4.7, 5.4, 7.4, 8.3, 8.4, 9.1, 9.2, 10.1, 10.2, 12.4, 12.5, 15.3, 16.3, 17.7, 24.1 and 25.1 have $N_z$ coefficient from 0.2 to 0.8, which can be used as Z films. Those invention film samples have improved wavelength dispersion with $R_e$(450 nm)/$R_e$ (550 nm) smaller than 1.02, $R_e$(650 nm)/$R_e$ (550 nm) equal to or greater than 0.95, ratio of $R_e$ (589 nm) and d (nm) multiplied by 1000 is from −6.0 to −0.5. More specifically, Film 1.7, 2.6, 3.3, 3.5, 4.6, 4.7, 5.4, 7.4, 8.3, 8.4, 9.1, 10.1, 10.2, 12.4, 12.5, 15.3, 16.3, 17.7 and 25.1 have improved $N_z$ coefficient from 0.3 to 0.7. Further more specifically, Film 1.7, 3.5, 8.3, 8.4, 15.3 and 25.1 have further improved Nz coefficient from 0.4 to 0.6. Further more specifically, Film 15.3, 16.3 and 17.7 have Nz coefficient from 0.3 to 0.7 and further improved wavelength dispersion with $R_e$(450 nm)/$R_e$ (550 nm) equal to or smaller than 0.90, $R_e$(650 nm)/$R_e$ (550 nm) equal to or greater than 0.99, ratio of $R_e$ (589 nm) and d (nm) multiplied by 1000 is from −6.0 to −0.5.

Film 1.3, 1.19, 2.5, 3.4, 5.3, 6.3, 7.5, 9.3, 10.3, 11.1, 11.3, 11.4, 13.4, 17.6, 18.4, 19.4, 19.6, 20.3 have Nz coefficient from 0.8 to 1.2, which can be used as −A films. Those film samples have improved wavelength dispersion with $R_e$(450 nm)/$R_e$ (550 nm) equal to or smaller than 1.05, $R_e$(650 nm)/$R_e$ (550 nm) equal to or greater than 0.95, ratio of $R_e$ (589 nm) and d (nm) multiplied by 1000 is from −6.0 to −0.5. More specifically, Film 1.3, 6.3, 7.5, 11.1 and 17.6 have further improved wavelength dispersion with $R_e$(450 nm)/$R_e$ (550 nm) equal to or smaller than 0.95, $R_e$(650 nm)/$R_e$ (550 nm) equal to or greater than 0.97.

Table 11 also shows examples (Film 21.1 to 22.3) that don't have improved wavelength dispersion compared to the control samples.

Table 11 provides additional data on the films that were prepared. The film thickness after stretching, $R_e$ measured at 589 nm, $R_{th}$ measured at 589 nm, $R_e$(450 nm)/$R_e$(550 nm), $N_z$ Coefficient, $R_e$/d, $R_{th}$/d are provided.

TABLE 11

| Film | Resin (Ex #) | Thickness d (μm) | $R_e$ (589 nm) (nm) | $R_{th}$ (589 nm) (nm) | $R_e$(450 nm/$R_e$ (550 nm) | $R_e$(650 nm)/$R_e$ (550 nm) | $N_z$ coefficient | Note | [$R_e$(589 nm)/d(nm)] * $10^3$ | [$R_{th}$(589 nm)/d(nm)] * $10^3$ |
|---|---|---|---|---|---|---|---|---|---|---|
| 1.1 | 1 | 90 | −325 | 143 | 1.15 | 0.93 | 0.94 | C | −3.61 | 1.59 |
| 1.2 | 1 | 70 | −182 | −11 | 1.13 | 0.94 | 0.44 | C | −2.60 | −0.15 |
| 1.3 | •1 | 58 | −129 | 49 | 0.93 | 0.98 | 0.88 | I | −2.23 | 0.84 |
| 1.4 | 1 | 37 | −53 | −21 | 0.97 | 0.98 | 0.11 | I | −1.42 | −0.56 |
| 1.5 | 1 | 48 | −63 | 16 | 0.78 | 1.01 | 0.75 | I | −1.32 | 0.32 |
| 1.6 | 1 | 46 | −64 | −43 | 0.69 | 1.02 | −0.17 | I | −1.40 | 1.76 |
| 1.7 | •1 | 78 | −98 | 7 | 1.02 | 0.95 | 0.58 | I | −1.26 | 0.10 |
| 1.8 | 1 | 50 | −68 | −97 | 1.03 | 0.96 | −0.92 | I | −1.37 | −1.94 |
| 1.9 | 1 | 43 | −45 | −68 | 1.03 | 0.96 | −0.99 | I | −1.05 | −1.57 |
| 1 10 | 1 | 54 | −63 | 15 | 1.03 | 0.95 | 0.74 | I | −1.17 | 0.28 |
| 1.11 | 1 | 58 | −88 | −20 | 0.93 | 0.98 | 0.27 | I | −1.52 | −0.35 |
| 1.12 | 1 | 38 | −42 | −109 | 0.98 | 0.98 | −2.06 | I | −1.12 | −2.86 |
| 1.13 | 1 | 54 | −63 | −28 | 0.91 | 0.98 | 0.05 | I | −1.17 | −0.52 |
| 1 14 | 1 | 47 | −49 | −148 | 0.98 | 0.98 | −2.55 | I | −1.04 | −3.16 |
| 1.15 | 1 | 42 | −146 | 65 | 1.10 | 0.94 | 0.95 | I | −3.47 | 1.55 |
| 1.16 | 1 | 56 | −52 | 10 | 1.10 | 0.94 | 0.69 | I | −0.93 | 0.18 |
| 1.17 | 1 | 56 | −104 | 49 | 1.07 | 0.95 | 0.97 | I | −1.85 | 0.88 |
| 1 18 | 1 | 38 | −56 | 19 | 1.06 | 0.96 | 0.84 | I | −1.48 | 0.50 |
| 1.19 | 1 | 50 | −85 | 48 | 1.00 | 0.97 | 1.07 | I | −1.71 | 0.97 |
| 2.1 | 2 | 80 | −350 | 182 | 1.14 | 0.93 | 1.02 | C | −4.38 | 2.27 |
| 2.2 | 2 | 52 | −169 | 27 | 1.12 | 0.94 | 0.66 | C | −3.25 | 0.51 |
| 2.3 | 2 | 78 | −380 | 194 | 1.13 | 0.94 | 1.01 | C | −4.88 | 2.49 |
| 2.4 | 2 | 62 | −181 | 96 | 1.12 | 0.94 | 1.03 | C | −2.92 | 1.55 |
| 2.5 | 2 | 74 | −168 | 82 | 1.00 | 0.96 | 0.99 | I | −2.27 | 1.11 |
| 2.6 | 2 | 54 | −105 | 18 | 1.01 | 0.97 | 0.67 | I | −1.95 | 0.32 |
| 3.1 | 3 | 47 | −240 | 139 | 1.12 | 0.94 | 1.08 | C | −5.10 | 2.96 |
| 3.2 | 3 | 37 | −82 | 94 | 1.11 | 0.94 | 1.66 | C | −2.21 | 2.55 |
| 3.3 | 3 | 41 | −104 | 6 | 1.03 | 0.97 | 0.56 | I | −2.54 | 0.14 |
| 3.4 | 3 | 45 | −170 | 62 | 1.03 | 0.97 | 0.86 | I | −3.77 | 1.37 |
| 3.5 | 3 | 30 | −62 | 5 | 0.96 | 0.98 | 0.58 | I | −2.07 | 0.18 |
| 4.1 | 4 | 41 | −201 | 102 | 1.14 | 0.93 | 1.01 | C | −4.90 | 2.49 |
| 4.2 | 4 | 29 | −79 | 16 | 1.13 | 0.94 | 0.70 | C | −2.72 | 0.56 |
| 4.3 | 4 | 36 | −180 | 86 | 1.13 | 0.93 | 0.98 | C | −5.01 | 2.40 |
| 4.4 | 4 | 26 | −54 | 27 | 1.13 | 0.94 | 0.99 | C | −2.09 | 1.03 |
| 4.5 | 4 | 37 | −107 | 24 | 0.97 | 0.98 | 0.73 | I | −2.89 | 0.66 |
| 4.6 | 4 | 36 | −52 | −7 | 1.00 | 0.97 | 0.37 | I | −1.45 | −0.18 |
| 4.7 | 4 | 32 | −53 | −11 | 1.01 | 0.97 | 0.30 | I | −1.66 | −0.34 |
| 5.1 | 5 | 40 | −86 | 59 | 1.12 | 0.94 | 1.19 | C | −2.15 | 1.48 |
| 5.2 | 5 | 35 | −141 | 71 | 1.13 | 0.94 | 1.01 | C | −4.03 | 2.04 |
| 5.3 | 5 | 37 | −97 | 42 | 0.99 | 0.97 | 0.94 | I | −2.61 | 1.14 |

TABLE 11-continued

| Film | Resin (Ex #) | Thickness d (μm) | $R_e$ (589 nm) (nm) | $R_{th}$ (589 nm) (nm) | $R_e$(450 nm/$R_e$ (550 nm) | $R_e$(650 nm)/$R_e$ (550 nm) | $N_z$ coefficient | Note | [$R_e$(589 nm)/ d(nm)] * $10^3$ | [$R_{th}$(589 nm)/ d(nm)] * $10^3$ |
|---|---|---|---|---|---|---|---|---|---|---|
| 5.4 | 5 | 28 | −55 | 6 | 1.01 | 0.97 | 0.61 | I | −1.97 | 0.21 |
| 6.1 | 6 | 18 | −42 | 14 | 1.17 | 0.92 | 0.83 | C | −2.33 | 0.77 |
| 6.2 | 6 | 35 | −44 | 16 | 1.19 | 0.91 | 0.85 | C | −1.26 | 0.45 |
| 6.3 | 6 | 62 | −77 | 28 | 0.87 | 0.98 | 0.87 | I | −1.24 | 0.45 |
| 6.4 | 6 | 46 | −36 | −55 | 0.90 | 0.98 | −1.05 | I | −0.77 | −1.20 |
| 7.1 | 7 | 33 | −101 | 60 | 1.15 | 0.92 | 1.09 | C | −3.05 | 1.81 |
| 7.2 | 7 | 35 | −54 | 27 | 1.14 | 0.93 | 0.99 | C | −1.53 | 0.76 |
| 7.3 | 7 | 42 | −87 | 46 | 1.15 | 0.92 | 1.03 | C | −2.06 | 1.09 |
| 7.4 | 7 | 33 | −37 | 5 | 0.95 | 0.98 | 0.37 | I | −1.13 | −0.15 |
| 7.5 | 7 | 46 | −53 | 22 | 0.90 | 0.99 | 0.92 | I | −1.16 | 0.48 |
| 8.1 | 8 | 28 | −84 | 35 | 1.12 | 0.94 | 0.91 | C | −3.02 | 1.23 |
| 8.2 | 8 | 41 | −158 | 82 | 1.13 | 0.93 | 1.02 | C | −3.87 | 2.00 |
| 8.3 | 8 | 31 | −67 | 6 | 1.01 | 0.97 | 0.58 | I | −2.17 | 0.18 |
| 8.4 | 8 | 34 | −56 | −3 | 1.00 | 0.97 | 0.44 | I | −1.64 | −0.09 |
| 9.1 | 9 | 44 | −93 | 11 | 1.01 | 0.97 | 0.62 | I | −2.11 | 0.26 |
| 9.2 | 9 | 56 | −136 | 36 | 1.00 | 0.97 | 0.76 | I | −2.43 | 0.64 |
| 9.3 | 9 | 64 | −200 | 116 | 1.00 | 0.97 | 1.08 | I | −3.13 | 1.81 |
| 10.1 | 10 | 44 | −132 | 17 | 1.00 | 0.98 | 0.63 | I | −2.99 | 0.40 |
| 10.2 | 10 | 49 | −96 | 17 | 1.00 | 0.98 | 0.68 | I | −1.96 | 0.35 |
| 10.3 | 10 | 66 | −199 | 96 | 0.99 | 0.98 | 0.95 | I | −3.02 | 1.36 |
| 11.1 | 11 | 76 | −194 | 100 | 0.91 | 1.00 | 1.02 | I | −2.55 | 1.32 |
| 11.2 | 11 | 56 | −82 | 27 | 0.92 | 1.00 | 0.82 | I | −1.47 | 0.47 |
| 11.3 | 11 | 58 | −126 | 68 | 0.98 | 0.98 | 1.04 | I | −2.18 | 1.17 |
| 11.4 | 11 | 41 | −63 | 43 | 0.99 | 0.98 | 1.19 | I | −1.54 | 1.06 |
| 12.1 | 12 | 45 | −50 | 35 | 1.12 | 0.94 | 1.20 | C | −1.11 | 0.78 |
| 12.2 | 12 | 52 | −51 | 31 | 1.14 | 0.93 | 1.11 | C | −0.98 | 0.60 |
| 12.3 | 12 | 34 | −49 | 19 | 0.75 | 1.00 | 0.89 | I | −1.43 | 0.56 |
| 12.4 | 12 | 46 | −41 | 8 | 0.79 | 1.00 | 0.70 | I | −0.89 | 0.18 |
| 12.5 | 12 | 50 | −46 | 7 | 1.04 | 0.96 | 0.65 | I | −0.93 | 0.14 |
| 13.1 | 13 | 47 | −79 | 124 | 1.10 | 0.95 | 2.08 | C | −1.68 | 2.65 |
| 13.2 | 13 | 56 | −120 | 115 | 1.10 | 0.95 | 1.46 | C | −2.14 | 2.05 |
| 13.3 | 13 | 38 | −52 | 77 | 1.05 | 0.97 | 1.98 | I | −1.37 | 2.03 |
| 13.4 | 13 | 66 | −198 | 108 | 1.05 | 0.97 | 1.04 | I | −3.00 | 1.63 |
| 14.1 | 14 | 45 | −55 | 81 | 1.09 | 0.95 | 1.97 | C | −1.23 | 1.80 |
| 14.2 | 14 | 66 | −207 | 110 | 1.09 | 0.95 | 1.03 | C | −3.14 | 1.66 |
| 14.3 | 14 | 45 | −119 | 163 | 0.99 | 0.99 | 1.87 | I | −2.65 | 3.63 |
| 14.4 | 14 | 60 | −222 | 147 | 0.98 | 0.99 | 1.16 | I | −3.70 | 2.46 |
| 15.1 | 15 | 40 | −68 | 22 | 1.14 | 0.93 | 0.83 | C | −1.70 | 0.56 |
| 15.2 | 15 | 46 | −108 | 50 | 1.16 | 0.92 | 0.96 | C | −2.35 | 1.08 |
| 15.3 | 15 | 45 | −57 | −3 | 0.89 | 0.99 | 0.44 | I | −1.26 | −0.07 |
| 16.1 | 16 | 54 | −48 | 17 | 115 | 0.93 | 0.86 | I | −0.89 | 0.32 |
| 16.2 | 16 | 56 | −55 | −17 | 0.94 | 0.98 | 0.18 | I | −0.98 | −0.31 |
| 16.3 | 16 | 68 | −106 | −16 | 0.90 | 0.99 | 0.35 | I | −1.56 | −0.2 |
| 17.1 | 17 | 36 | −62 | 23 | 1.18 | 0.91 | 0.96 | C | −1.73 | 0.80 |
| 17.2 | 17 | 42 | −141 | 58 | 1.19 | 0.91 | 0.91 | C | −3.37 | 1.39 |
| 17.3 | 17 | 43 | −193 | 96 | 1.12 | 0.93 | 1.00 | I | −4.50 | 2.23 |
| 17.4 | 17 | 29 | −63 | 17 | 1.11 | 0.94 | 0.77 | I | −2.16 | 0.58 |
| 17.5 | 17 | 88 | −232 | 121 | 1.04 | 0.95 | 1.02 | I | −2.64 | 1.38 |
| 17.6 | 17 | 58 | −143 | 69 | 0.80 | 1.01 | 0.98 | I | −2.47 | 1.18 |
| 17.7 | 17 | 43 | −42 | −5 | 0.84 | 1.01 | 0.38 | I | −0.98 | −0.12 |
| 18.1 | 18 | 29.0 | −101 | 87 | 1.12 | 0.94 | 1.37 | C | −3.48 | 3.02 |
| 18.2 | 18 | 14.0 | −48 | 40 | 1.04 | 0.96 | 1.34 | I | −3.41 | 2.88 |
| 18.3 | 18 | 11.0 | −20 | 18 | 1.00 | 0.98 | 1.43 | I | −1.78 | 1.66 |
| 18.4 | 18 | 10.7 | −21 | 10 | 1.03 | 0.97 | 1.00 | I | −1.92 | 0.95 |
| 19.1 | 19 | 50 | −80 | 79 | 1.10 | 0.96 | 1.50 | C | −1.59 | 1.59 |
| 19.2 | 19 | 116 | −254 | 136 | 1.09 | 0.95 | 1.03 | C | −2.19 | 1.17 |
| 19.3 | 19 | 37 | −120 | 92 | 1.05 | 0.97 | 1.27 | I | −3.23 | 2.48 |
| 19.4 | 19 | 47 | −239 | 138 | 1.04 | 0.97 | 1.08 | I | −5.09 | 2.93 |
| 19.5 | 19 | 37 | −29 | 32 | 1.05 | 0.96 | 1.59 | I | −0.79 | 0.86 |
| 19.6 | 19 | 60 | −61 | 30 | 1.05 | 0.96 | 0.99 | I | −1.01 | 0.50 |
| 20.1 | 20 | 124 | −298 | 148 | 1.14 | 0.93 | 1.00 | C | −2.41 | 1.20 |
| 20.2 | 20 | 88 | −140 | 108 | 1.12 | 0.94 | 1.27 | C | −1.59 | 1.22 |
| 20.3 | 20 | 46 | −98 | 49 | 1.03 | 0.96 | 1.01 | I | −2.12 | 1.08 |
| 21.1 | 21 | 11.2 | −156 | 108 | 1.12 | 0.95 | 1.19 | C | −13.9 | 9.6 |
| 21.2 | 21 | 14.3 | −161 | 111 | 1.11 | 0.95 | 1.19 | DW | −11.3 | 7.7 |
| 21.3 | 21 | 12.9 | −13 | 26 | 1.09 | 0.95 | 2.53 | DW | −1.0 | 12.7 |
| 22.1 | 22 | 19.2 | −89 | 60 | 1.12 | 0.95 | 1.17 | C | −4.6 | 8.7 |
| 22.2 | 22 | 13.2 | −30 | 17 | 1.11 | 0.95 | 1.07 | DW | −2.3 | 9.7 |
| 22.3 | 22 | 14.7 | −84 | 56 | 1.11 | 0.95 | 1.17 | DW | −5.8 | 10.7 |
| 24.1 | 24 | 96 | −220 | 60 | 0.99 | 0.98 | 0.77 | I | −2.29 | 0.6 |
| 25.1 | 25 | 66 | −156 | 7 | 0.99 | 0.99 | 0.55 | I | −2.36 | 0.11 |

I means invention,
C means control,
DW means doesn't work.

As shown in Table 12, plasticizers were incorporated into the films. For films in Table x, Nz coefficient between 0.3 to 0.7 are obtained. More specifically, Re(450 nm/550 nm) values for the example films are not greater than 1.0, ratio of $R_e$ (589 nm) and d (nm) multiplied by 1000 is from −6.0 to −0.5.

TABLE 12

| Film # | Ex # | Component A (wt %) | Pz (wt %) | Stretch Ratio [Stretch Temp. (° C.)] | Thickness d (μm) | $R_e$ (589 nm) | $R_{th}$ (589 nm) | $R_e$(450 nm)/ $R_e$(550 nm) (A) | Re (650 nm)/$R_e$ (550 nm) | ($R_e$(589 nm)/ d(nm)] * $10^3$ | $R_{th}$(589 nm)/ d(nm) * 1000 | Nz coefficient |
|---|---|---|---|---|---|---|---|---|---|---|---|---|
| 25.2 | 25 | Tinuvin 479 (7.0) | Admex 523 (5.0) | 1.45 c [163] | 88 | −225 | 15 | 0.98 | 0.99 | −2.56 | 0.17 | 0.57 |
| 25.3 | 25 | Tinuvin 479 (7.8) | Admex 6995 (2.8) | 1.4 c [175] | 114 | −278 | 51 | 0.97 | 0.99 | −2.44 | 0.44 | 0.68 |
| 25.4 | 25 | Tinuvin 479 (7.65) | DEP (4.62) | 1.45 c [165] | 90 | −280 | 38 | 0.98 | 0.99 | −3.11 | 0.42 | 0.64 |
| 25.5 | 25 | Tinuvin 479 (7.65) | TPP (4.62) | 1.45 c [165] | 94 | −211 | 40 | 0.97 | 0.99 | −2.24 | 0.42 | 0.69 |
| 25.6 | 25 | Tinuvin 479 (7.15) | BANE (4.65) | 1.4 c [165] | 92 | −212 | 42 | 0.98 | 0.99 | −2.31 | 0.45 | 0.70 |
| 9.4 | 9 | Tinuvin 479 (4.8) | DEP (4.8) | 1.4 x [163] | 106 | −205 | 30 | 0.99 | 0.97 | −1.94 | 0.28 | 0.64 |
| 9.5 | 9 | Tinuvin 479 (5.7) | Admex 523 (4.7) | 1.5 x [168] | 60 | −168 | 23 | 0.98 | 0.98 | −2.80 | 0.38 | 0.63 |
| 9.6 | 9 | Tinuvin 479 (4.75) | Admex 525 (4.75) | 1.4 x [168] | 84 | −172 | 13 | 1.00 | 0.97 | −2.05 | 0.15 | 0.57 |
| 9.7 | 9 | Tinuvin 479 (6.7) | Admex 6995 (4.7) | 1.4 x [168] | 76 | −104 | −3 | 0.90 | 1.00 | −1.37 | −0.04 | 0.47 |

What is claimed is:

1. A film, comprising:

(1) a regioselectively substituted cellulose ester comprising:

(i) a plurality of aromatic-CO— substituents;

(ii) a plurality of a first unsaturated or saturated ($C_{1-6}$) alkyl-CO— substituents; and (iii) a plurality of hydroxyl substituents;

wherein:

the degree of substitution for the hydroxyl ("$DS_{OH}$") is from 0.2 to 1.1, the cellulose ester has a C2 degree of substitution for the aromatic-CO— substituent ("$C2DS_{ArCO}$") which is from 0.15 to 0.8, the cellulose ester has a C3 degree of substitution for the aromatic-CO— substituent ("$C3DS_{ArCO}$") which is from 0.05 to 0.6, the cellulose ester has a C6 degree of substitution for the aromatic-CO— substituent ("$C6DS_{ArCO}$") which is from 0.05 to 0.6, the total degree of substitution for the aromatic-CO— substituent ("$TotDS_{ArCO}$") which is from 0.25 to 2.0, the aromatic-CO— is (i) an ($C_{6-20}$)aryl-CO—, wherein the aryl is unsubstituted or substituted by 1-5 $R^1$;

(ii) a heteroaryl-CO—, wherein the heteroaryl is a 5- to 10-membered ring having 1- to 4-heteroatoms chosen from N, O, or S, and wherein the heteroaryl is unsubstituted or substituted by 1-5 $R^1$; and (2) a component A that is

I

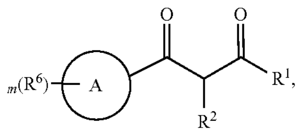

II

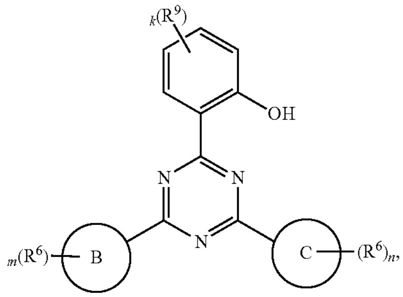

III

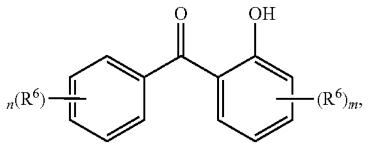

or

-continued

IV

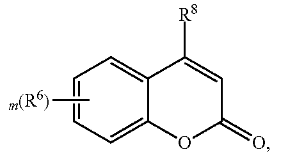

wherein:

ring A is an $(C_{6-20})$aryl or a 5- to 10-membered heteroaryl containing 1-4 heteroatoms chosen from N, O, or S;

ring B is $(C_{6-20})$aryl or a 5- to 10-membered heteroaryl containing 1-4 heteroatoms chosen from N, O, or S;

ring C is $(C_{6-20})$aryl a 5- to 10-membered heteroaryl containing 1-4 heteroatoms chosen from N, O, or S;

$R^1$ is saturated or unsaturated $(C_{1-20})$alkyl; saturated or unsaturated halo$(C_{1-20})$alkyl; $(C_{6-20})$aryl optionally by 1-5 substituted by alkyl, haloalkyl, alkoxy, haloalkoxy, halo; 5- to 10-membered heteroaryl containing 1-4 heteroatoms chosen from N, O, or S; or $—CH_2C(O)—R^3$;

$R^2$ is independently hydrogen, saturated or unsaturated $(C_{1-20})$alkyl, or saturated or unsaturated halo$(C_{1-20})$alkyl;

$R^3$ is saturated or unsaturated $(C_{1-20})$alkyl, saturated or unsaturated halo$(C_{1-20})$alkyl, $(C_{6-20})$aryl, or 5- to 10-membered heteroaryl containing 1-4 heteroatoms chosen from N, O, or S, wherein the aryl or heteroaryl are unsubstituted or substituted by 1-5 $R^6$;

$R^4$ is saturated or unsaturated $(C_{1-20})$alkyl, saturated or unsaturated halo$(C_{1-20})$alkyl, or saturated or unsaturated $(C_{1-20})$alkyl-CO—$(C_{1-20})$alkyl, wherein each of the groups is unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, saturated or unsaturated $(C_{1-20})$alkoxy-$(C_{1-20})$alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl;

each $R^5$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, or halo;

each $R^6$ is independently hydroxy, cyano, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$alkoxy, or halo or $(C_{6-20})$aryl, wherein the aryl is unsubstituted or substituted by 1-5 $R^7$;

each $R^7$ is independently hydroxyl, saturated or unsaturated $(C_{1-6})$alkyl, saturated or unsaturated halo$(C_{1-6})$alkyl, or saturated or unsaturated $(C_{1-6})$alkoxyl;

$R^8$ is saturated or unsaturated $(C_{1-20})$alkyl, saturated or unsaturated halo$(C_{1-20})$alkyl, saturated or unsaturated $(C_{1-20})$alkoxyl, or saturated or unsaturated halo$(C_{1-20})$alkoxyl;

each $R^9$ is $R^4$—O—, hydroxy, saturated or unsaturated $(C_{1-20})$alkyl, saturated or unsaturated hetero$(C_{1-20})$alkyl containing 1-2 heteroatoms chosen from N, O or S, saturated or unsaturated halo$(C_{1-20})$alkyl, saturated or unsaturated $(C_{1-20})$alkyl-CO—$(C_{1-20})$alkyl-, saturated or unsaturated $(C_{1-20})$alkyl-COO—$(C_{1-20})$alkyl-, saturated or unsaturated $(C_{1-20})$alkyl-COO—, saturated or unsaturated $(C_{1-20})$alkyl-O—CO—, saturated or unsaturated $(C_{1-2})$alkyl-CO—, saturated or unsaturated $(C_{1-20})$alkoxy-$(C_{1-20})$alkyl-CO—O—$(C_{1-2})$alkyl, saturated or unsaturated $(C_{1-2})$alkoxy-$(C_{1-2})$alkyl-O—CO— $(C_{1-2})$alkyl, saturated or unsaturated $(C_{1-2})$alkoxy-$(C_{1-2})$alkyl-CO— $(C_{1-20})$alkyl, $(C_{1-20})$alkoxy-$(C_{1-20})$alkyl-O—CO—$(C_{1-20})$alkyl-$(C_{6-10})$aryl, 5- to 10-membered heteroaryl containing 1-4 heteroatoms chosen from N, O, or S, wherein each of the groups are unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxyl, or saturated or unsaturated halo$(C_{1-20})$alkoxyl, saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, or saturated or unsaturated $(C_{1-20})$alkoxy-$(C_{1-20})$alkyl-CO—$(C_{1-20})$alkyl-, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$alkyl-O—CO—$(C_{1-20})$alkyl;

each n is 0, 1, 2, 3, 4, or 5;

each m is 0, 1, 2, 3, or 4; and k is 0, 1, 3, or 4, wherein:

component A is present at less than 30 wt %, based on the total weight of the film, the thickness of the film ("d") (μm) is from 10 μm to 200 μm, the film exhibits a $R_e$(589 nm) that is less than zero, the ratio of the $R_e$(589 nm) and d (nm) multiplied by 1000 is from −10 to −0.5, the ratio of the $R_{th}$ (589 nm) and d (nm) multiplied by 1000 is from −6.0 to 6.0, the film exhibits a [[—$R_{th}$(589 nm)/$R_e$(589 nm)]+0.5] ("$N_z$") is from −3.0 to 3.0, each $R_e$(589 nm) is the in-plane retardation measured at 589 nm, each $R_{th}$(589 nm) is the out-of-plane retardation measured at 589 nm, and the film is stretched.

2. The film of claim 1, wherein $R_e$ (589 nm) is from −120 to −320 nm and $R_{th}$ (589 nm) is from −60 to 60 nm.

3. The film of claim 1, wherein $R_e$ (589 nm) is from −120 to −320 nm and $R_{th}$ (589 nm) is from 60 to 220 nm.

4. The film of claim 1, wherein the ratio of $R_e$(450 nm) to $R_e$(550 nm) is less than 1.05, wherein $R_e$(450 nm) is the in-plane retardation measured at 450 nm, and $R_e$(550 nm) is the in-plane retardation measured at 550 nm.

5. The film of claim 4, wherein the ratio of $R_e$(450 nm) to $R_e$(550 nm) is from 0.75 to 0.85.

6. The film of claim 1, wherein the ratio of $R_e$(650 nm) to $R_e$(550 nm) is greater than 0.95, wherein the $R_e$(650 nm) is the in-plane retardation measured at 650 nm and $R_e$(550 nm) is the in-plane retardation measured at 550 nm.

7. The film of claim 6, wherein the ratio of $R_e$(650 nm) to $R_e$(550 nm) is from 1.10 to 1.2.

8. The film of claim 1, wherein the component A is

I

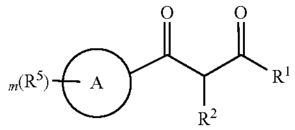

or

II

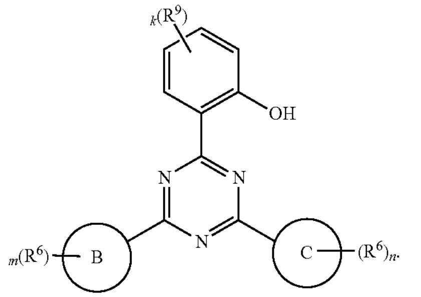

9. The film of claim 1, wherein the component A is 1,3-diphenyl-1,3-propanedione, avobenzone, (2-hydroxy-4-(octyloxy)phenyl(phenyl)methanone, (2-hydroxy-4-methoxyphenyl)(2-hydroxyphenyl)methanone, 2-(4,6-di-phenyl-1,3,5-triazin-2-yl)-5-(hexyloxy)phenol, 2-[4,6-bis(2,4-dimethylphenyl)-1,3,5-triazin-2-yl]-5-[2-hydroxy-3-(dodecyloxy- and tridecyloxy)propoxy]phenols, isooctyl 2-(4-(4,6-di([1,1'-biphenyl]-4-yl)-1,3,5-triazin-2-yl)-3-hy-droxyphenoxy)propanoate, 6,6'-(6-(2,4-dibutoxyphenyl)-1,3,5-triazine-2,4-diyl)bis(3-butoxyphenol), 2-(4,6-bis(2,4-di-methylphenyl)-1,3,5-triazin-2-yl)-5-(3-((2-ethylhexyl)oxy)-2-hydroxypropoxy)phenol, 7-diethylamino-4-methylcoumarin, or combinations thereof.

10. The film of claim 1, wherein the aromatic-CO— is an $(C_{6-20})$aryl-CO—, wherein the aryl is unsubstituted or substituted by 1-5 $R^1$.

11. The film of claim 1, wherein the aromatic-CO— is benzoyl or naphthoyl, which is unsubstituted or substituted by 1-5 $R^1$.

12. The film of claim 11, wherein the aromatic-CO— is benzoyl, unsubstituted or substituted by 1-5 $R^1$.

13. The film of claim 12, wherein the cellulose ester has a $totDS_{ArCO}$ of from 0.40 to 1.60.

14. The film of claim 13, wherein the sum of $C2DS_{ArCO}$ and $C3DS_{ArCO}$ is from 0.30 to 1.25.

15. The film of claim 11, wherein the aromatic-CO— is naphthoyl, unsubstituted or substituted by 1-5 $R^1$.

16. The film of claim 15, wherein cellulose ester has a $totDS_{ArCO}$ of from 0.3 to 0.8.

17. The film of claim 16, wherein the sum of $C2DS_{ArCO}$ and $C3DS_{ArCO}$ is from 0.2 to 0.6.

18. The film of claim 1, wherein the cellulose ester further comprises a plurality of a second $(C_{1-20})$alkyl-CO— substituent.

19. The film of claim 8, wherein $N_z$ is from 0.4 to 0.6.

20. The film of claim 1, further comprising 0.1 to 15 wt % of a plasticizer.

* * * * *